(12) United States Patent
Boltshauser

(10) Patent No.: US 7,670,094 B2
(45) Date of Patent: Mar. 2, 2010

(54) METHOD AND DEVICE FOR PRODUCING A CAN BODY AND CAN BODY

(75) Inventor: Werner Boltshauser, Butschwil (CH)

(73) Assignee: Crebocan AG, Butschwil (CH)

( * ) Notice: Subject to any disclaimer, the term of this patent is extended or adjusted under 35 U.S.C. 154(b) by 354 days.

(21) Appl. No.: 10/585,996

(22) PCT Filed: Jan. 14, 2005

(86) PCT No.: PCT/CH2005/000016

§ 371 (c)(1),
(2), (4) Date: May 31, 2007

(87) PCT Pub. No.: WO2005/068127

PCT Pub. Date: Jul. 28, 2005

(65) Prior Publication Data

US 2008/0050205 A1 Feb. 28, 2008

(30) Foreign Application Priority Data

| Jan. 15, 2004 | (CH) | .................................... 0054/04 |
| Jun. 17, 2004 | (WO) | ............... PCT/CH2004/000368 |

(51) Int. Cl.
*B21D 51/26* (2006.01)
(52) U.S. Cl. .......................................... 413/2; 72/379.4
(58) Field of Classification Search .................... 413/1, 413/2, 3, 4, 18, 26, 52, 55, 69, 70, 72, 74, 413/77; 72/57, 58, 370.06, 370.14, 370.23, 72/379.4, 361; 29/429, 469, 564.1, 773, 29/781, 33 R; 219/61.11, 604; 228/13, 160
See application file for complete search history.

(56) References Cited

U.S. PATENT DOCUMENTS

| 2,444,465 | A | | 7/1948 | Peters |
| 3,337,944 | A | * | 8/1967 | Morris ......................... 29/413 |
| 3,548,564 | A | * | 12/1970 | Bruce et al. .................... 53/470 |

(Continued)

FOREIGN PATENT DOCUMENTS

DE  24 56 097 A1  6/1975

(Continued)

*Primary Examiner*—Jimmy T Nguyen
(74) *Attorney, Agent, or Firm*—Harness, Dickey & Pierce

(57) ABSTRACT

To produce can bodies, a continuous can jacket is disclosed, that is sealed by way of a first joint is produced from a flat metal material. At least one sealing element is mounted on the continuous can jacket by way of an additional joint. At least one of the additional joints is configured as a laser welding seam, which forms an annular continuous sealing seam between the continuous can jacket and the sealing element(s). Before the sealing seam is welded, complementary seam contact surfaces of the can jacket and the sealing element are configured as annular continuous edge regions that flare out of narrow towards the can axis. To weld the sealing seam, the can jacket and the sealing element(s) are pushed together until the edge regions make contact, one of the end faces of the two edge regions lying on the interior of the can body and the other lying on the exterior of the body. This enables the air-free welding of the seam contact surfaces, thus guaranteeing an impermeable welding seam even with the use of extremely thin metal sheets. The material overlap in the vicinity of the sealing seam is minimal.

11 Claims, 14 Drawing Sheets

U.S. PATENT DOCUMENTS

| | | |
|---|---|---|
| 4,095,544 A | 6/1978 | Peters et al. |
| 4,199,851 A | 4/1980 | Doherty |
| 4,341,943 A | 7/1982 | Nilsen |
| 5,060,367 A | 10/1991 | Vandevoorde |
| 5,186,592 A | 2/1993 | Budenbender et al. |

FOREIGN PATENT DOCUMENTS

| | | |
|---|---|---|
| DE | 197 16 079 A1 | 4/1998 |
| DE | 198 34 400 C1 | 1/2000 |
| EP | 0 200 098 A2 | 11/1986 |
| EP | 0 208 564 A | 1/1987 |
| EP | 0 397 558 A1 | 11/1990 |
| EP | 0 525 729 A1 | 2/1993 |
| EP | 0 547 754 A2 | 6/1993 |
| EP | 0 666 124 B1 | 1/1997 |
| EP | 1 153 837 A1 | 11/2001 |
| WO | WO 95/34474 | 12/1995 |
| WO | WO 02/42196 A | 5/2002 |
| WO | WO 02/092466 A | 11/2002 |
| WO | WO 2005/000498 A | 1/2005 |

* cited by examiner

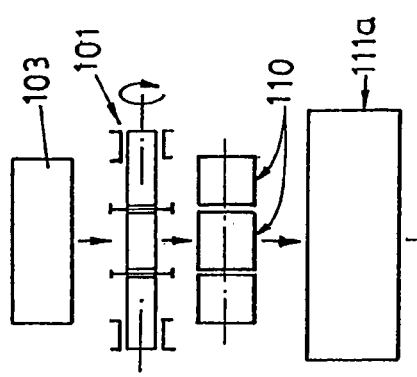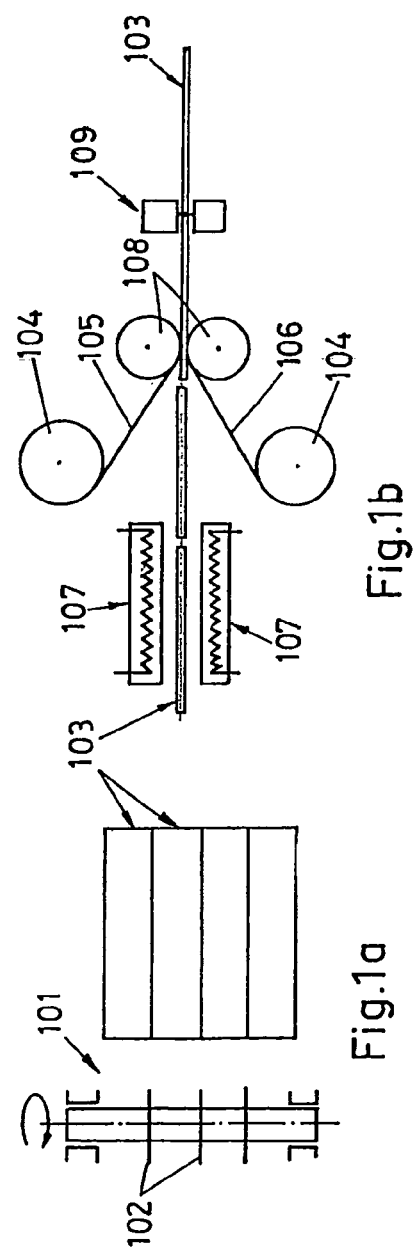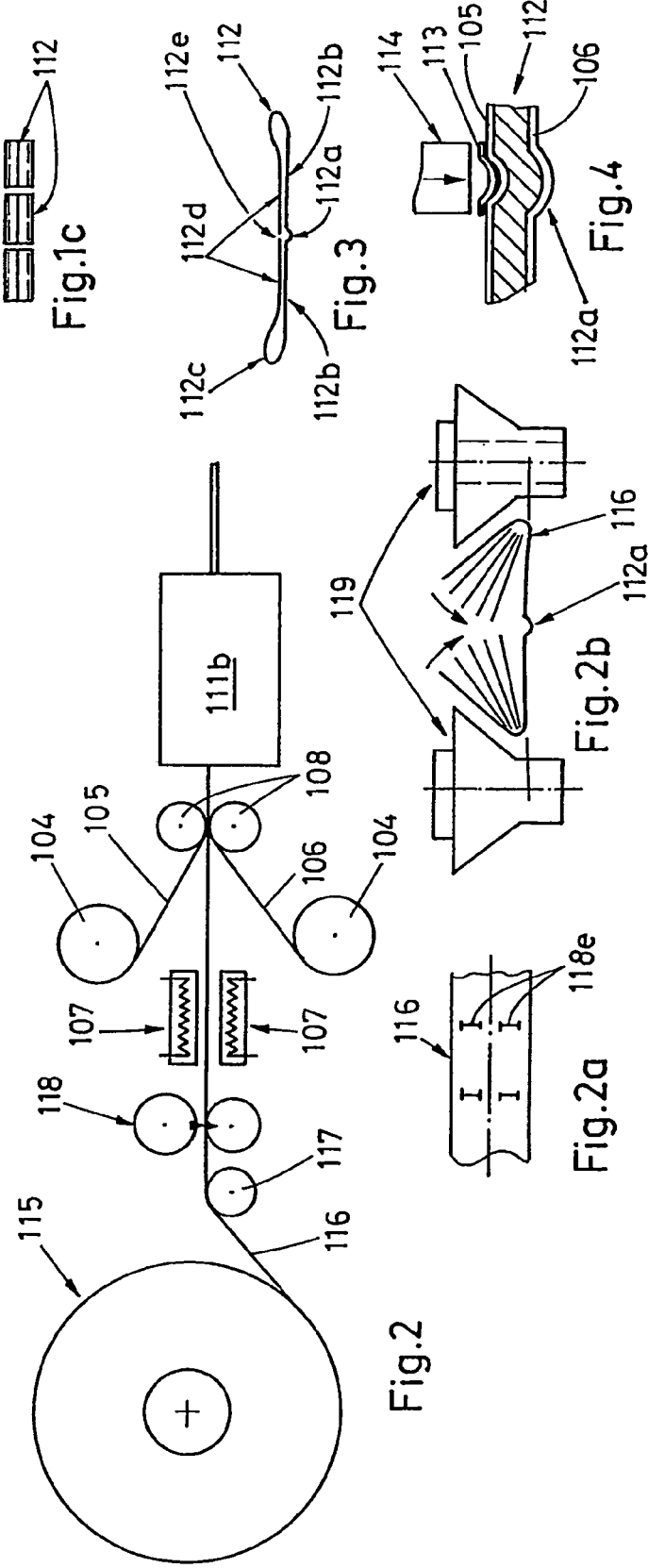

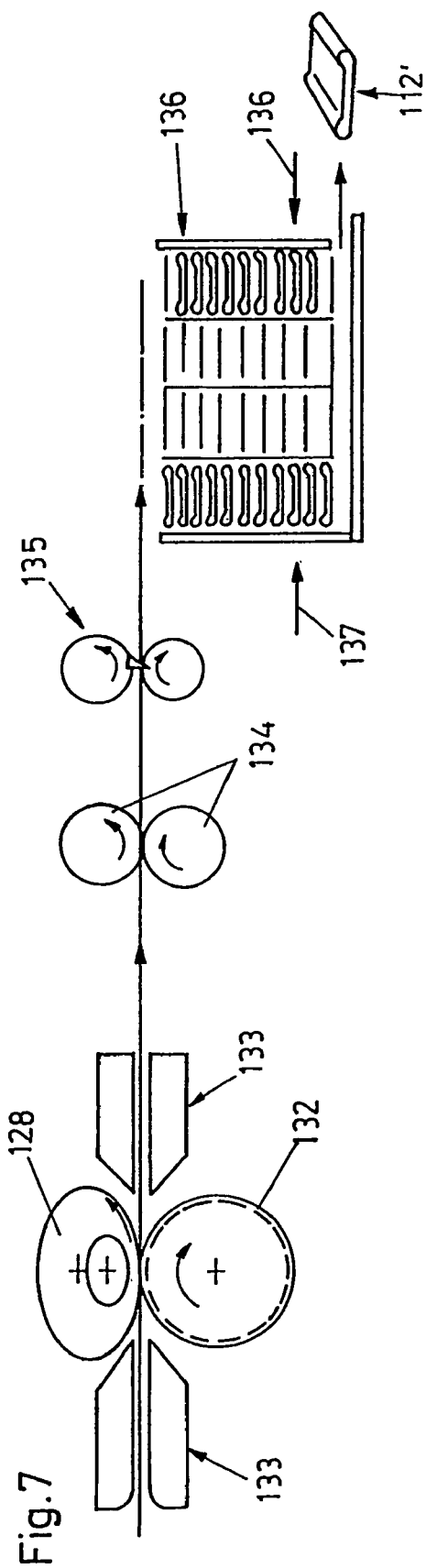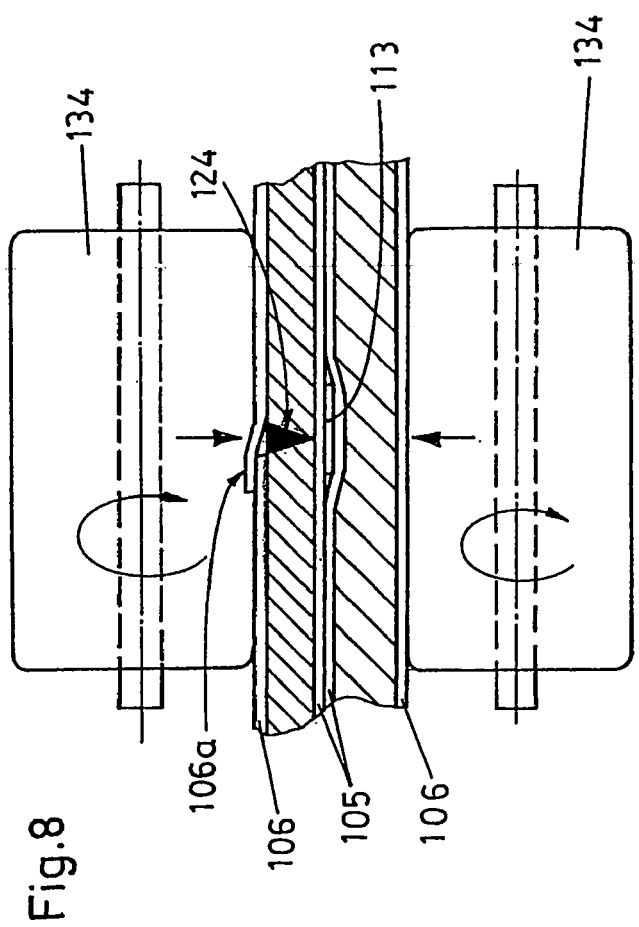

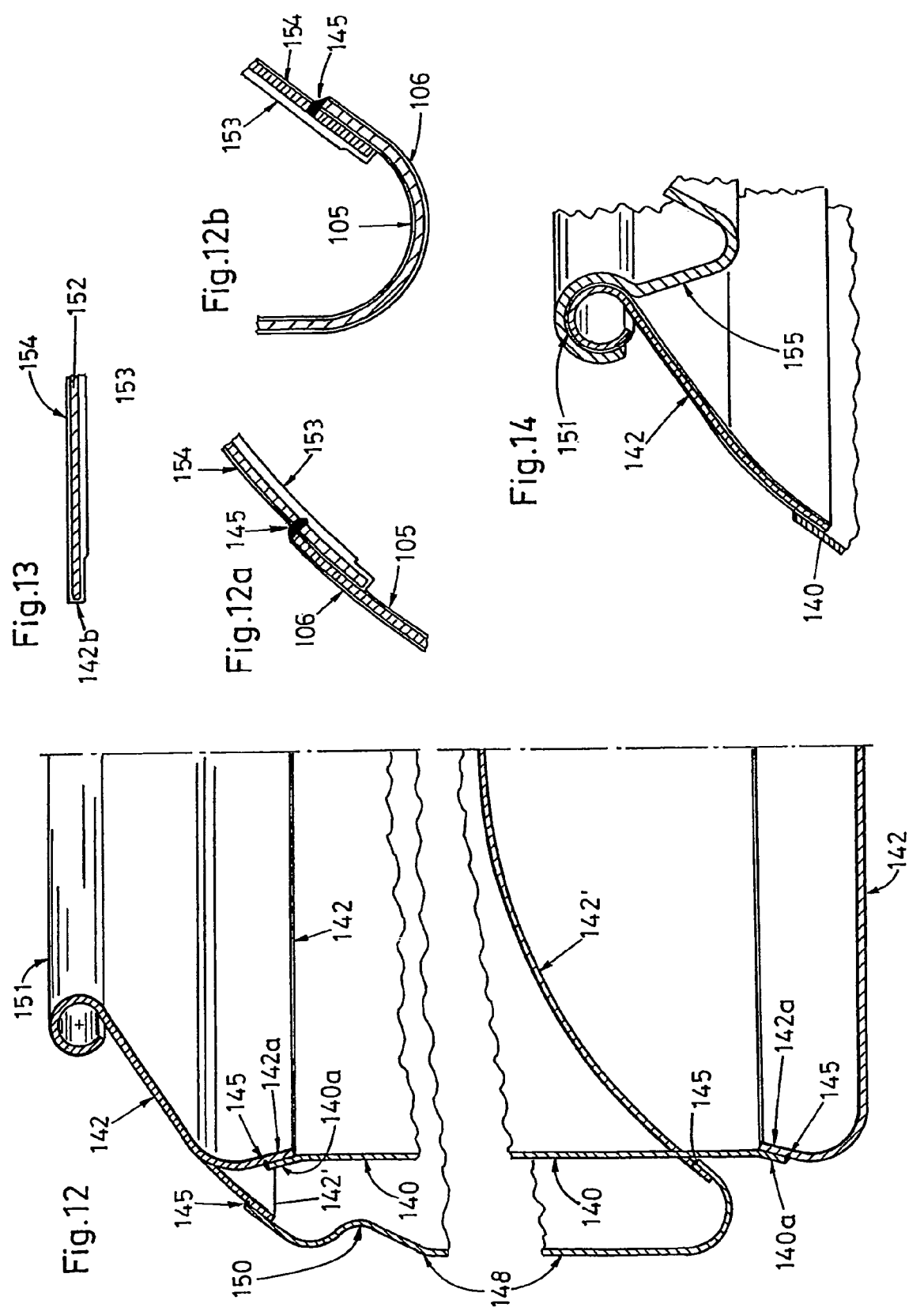

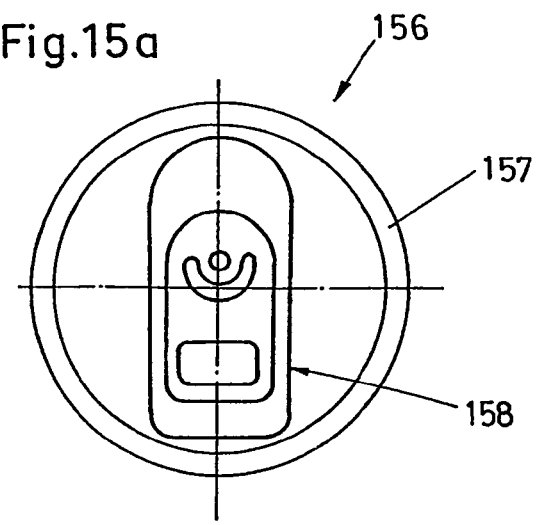
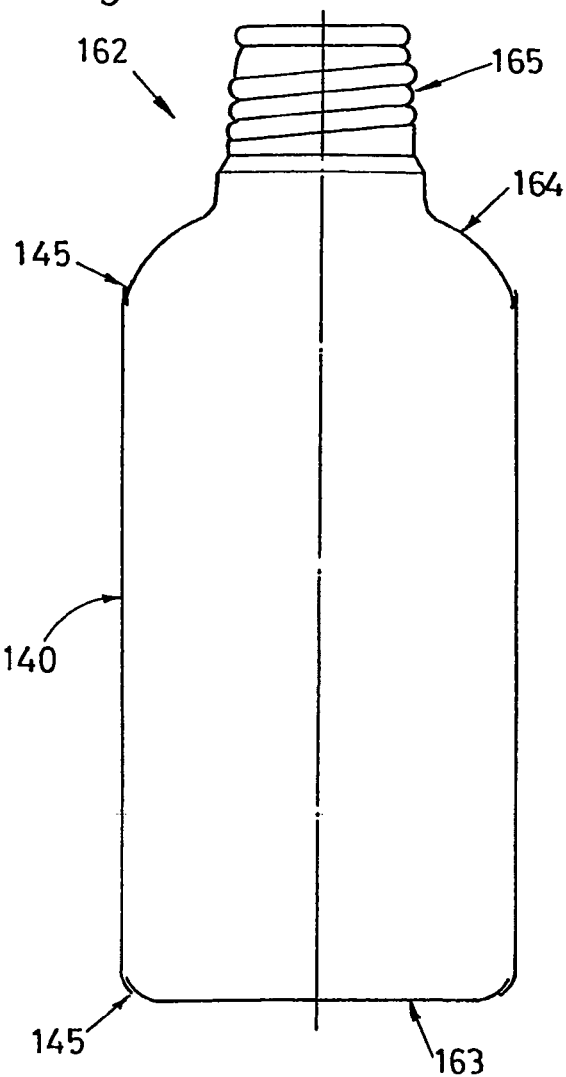
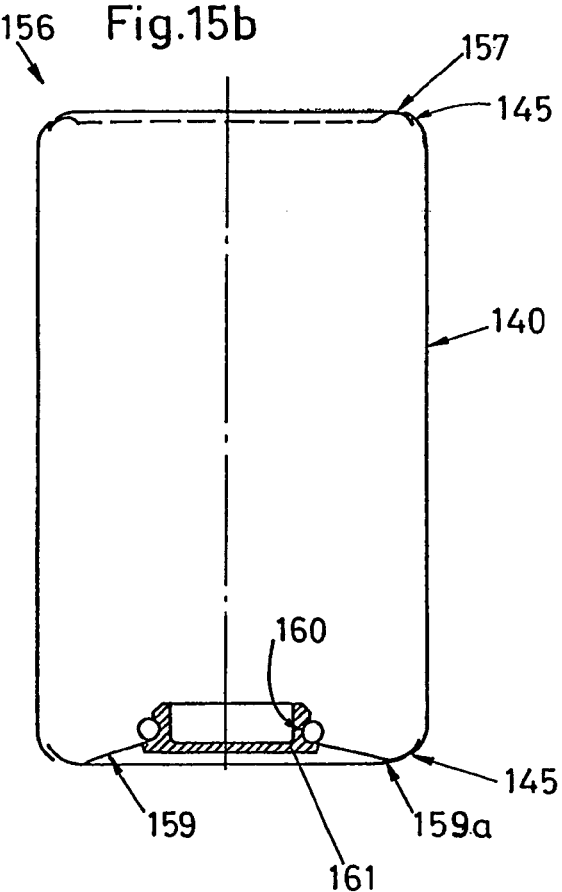
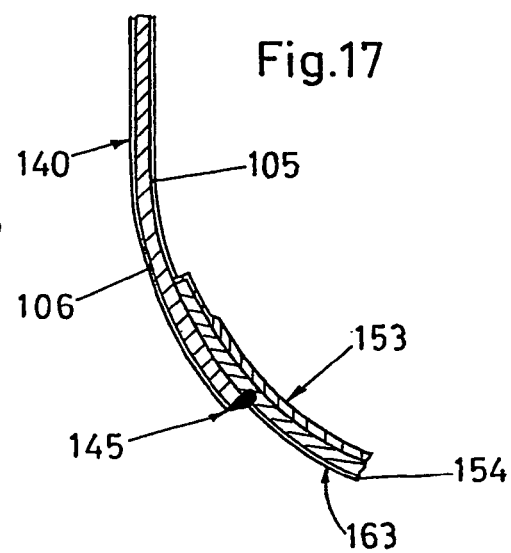

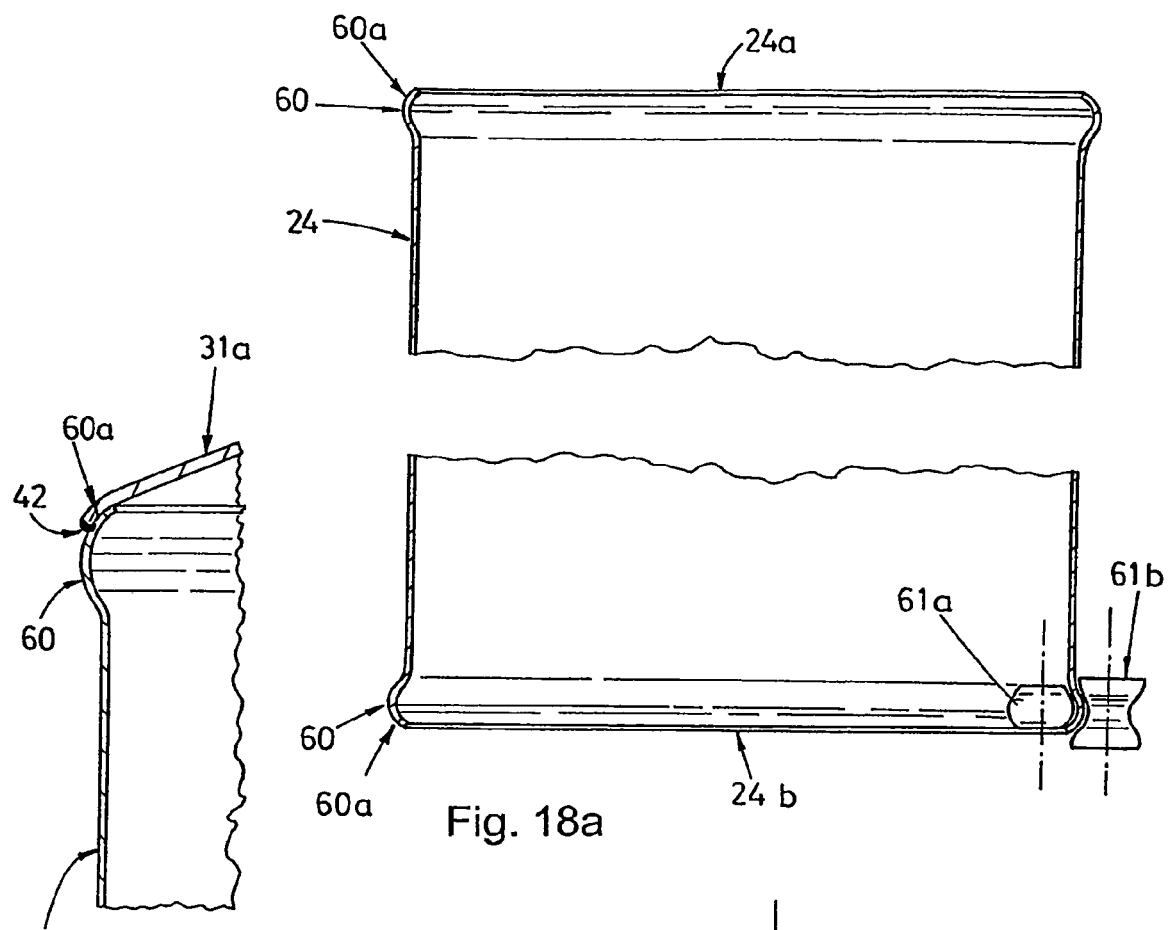
Fig. 18a
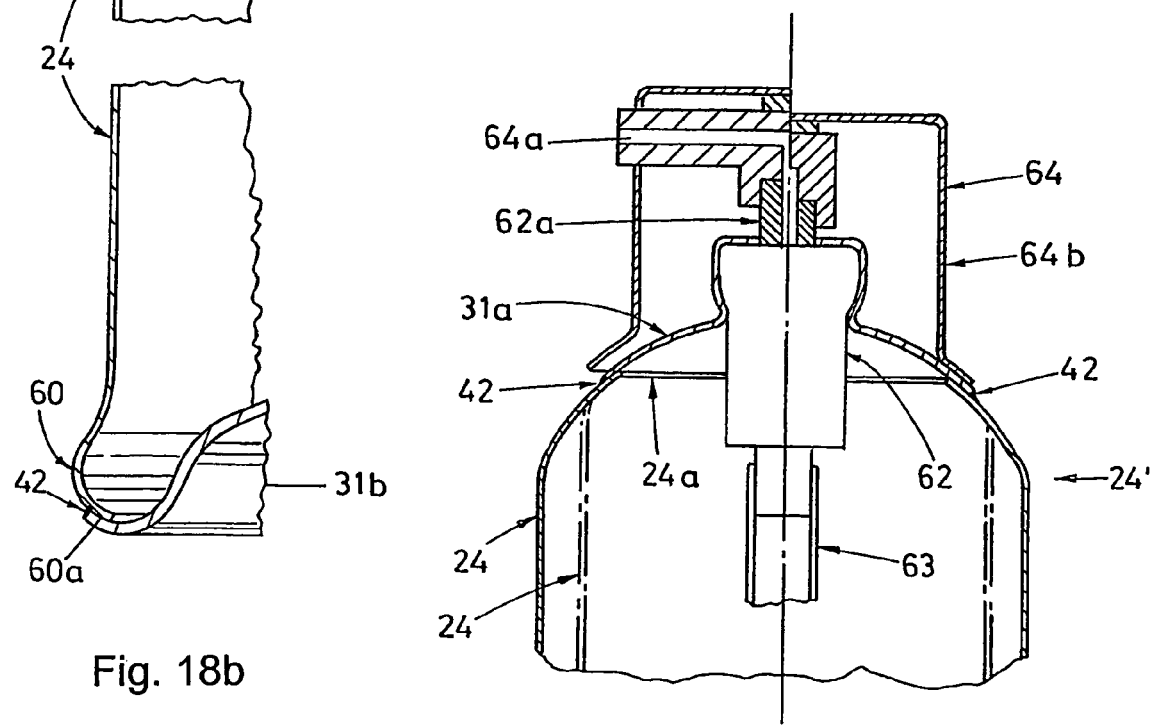
Fig. 18b
Fig. 20

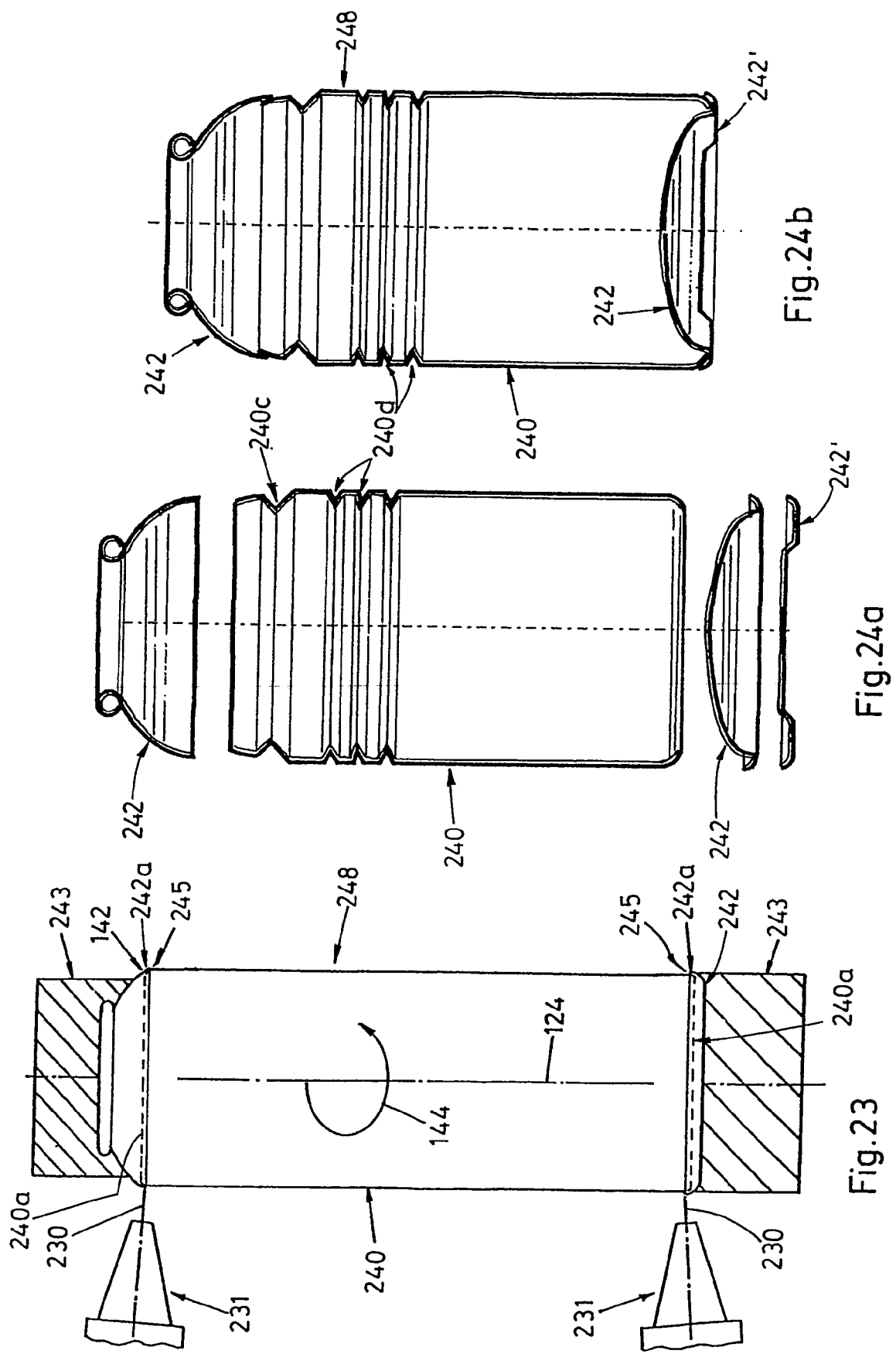

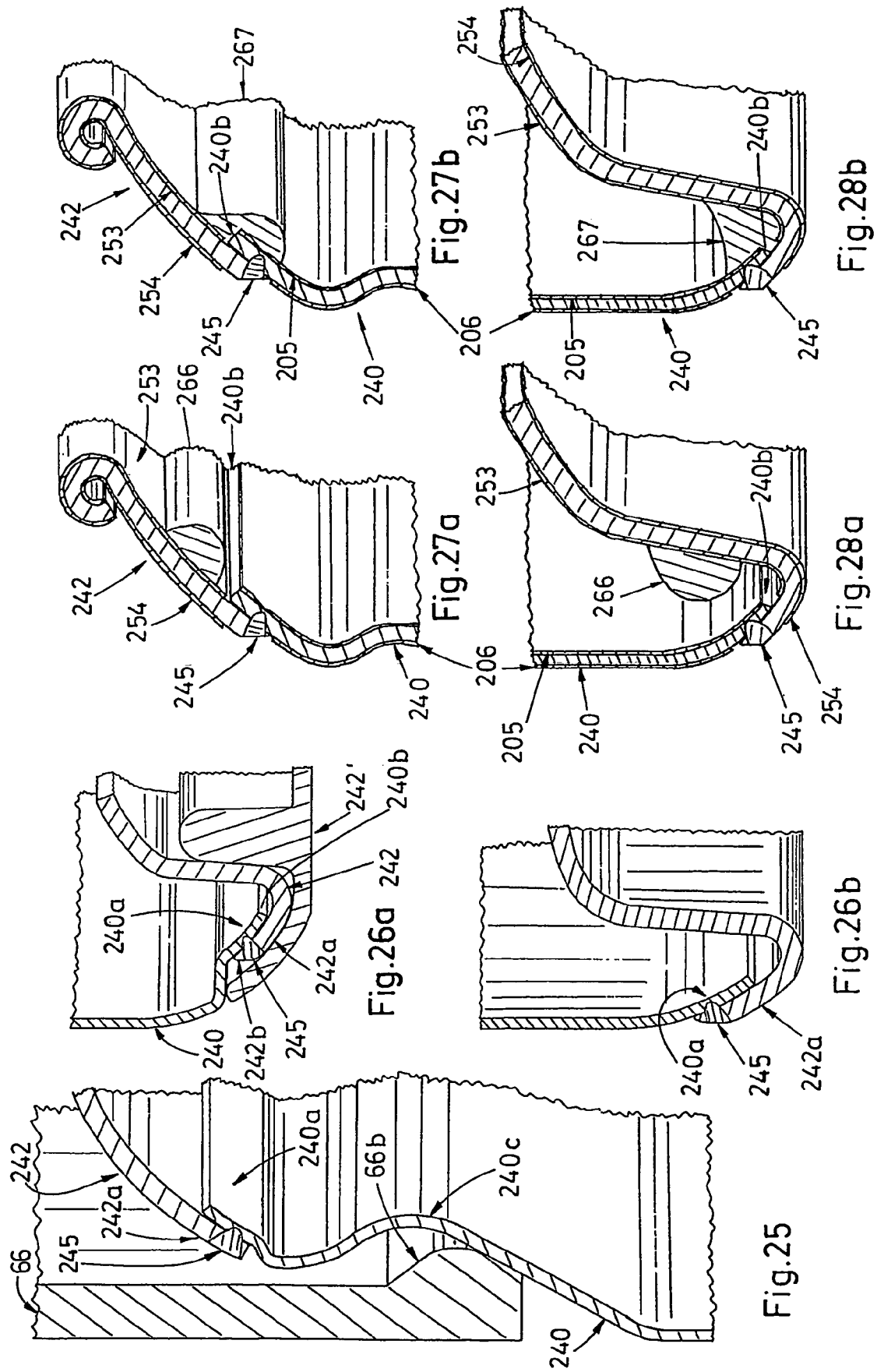

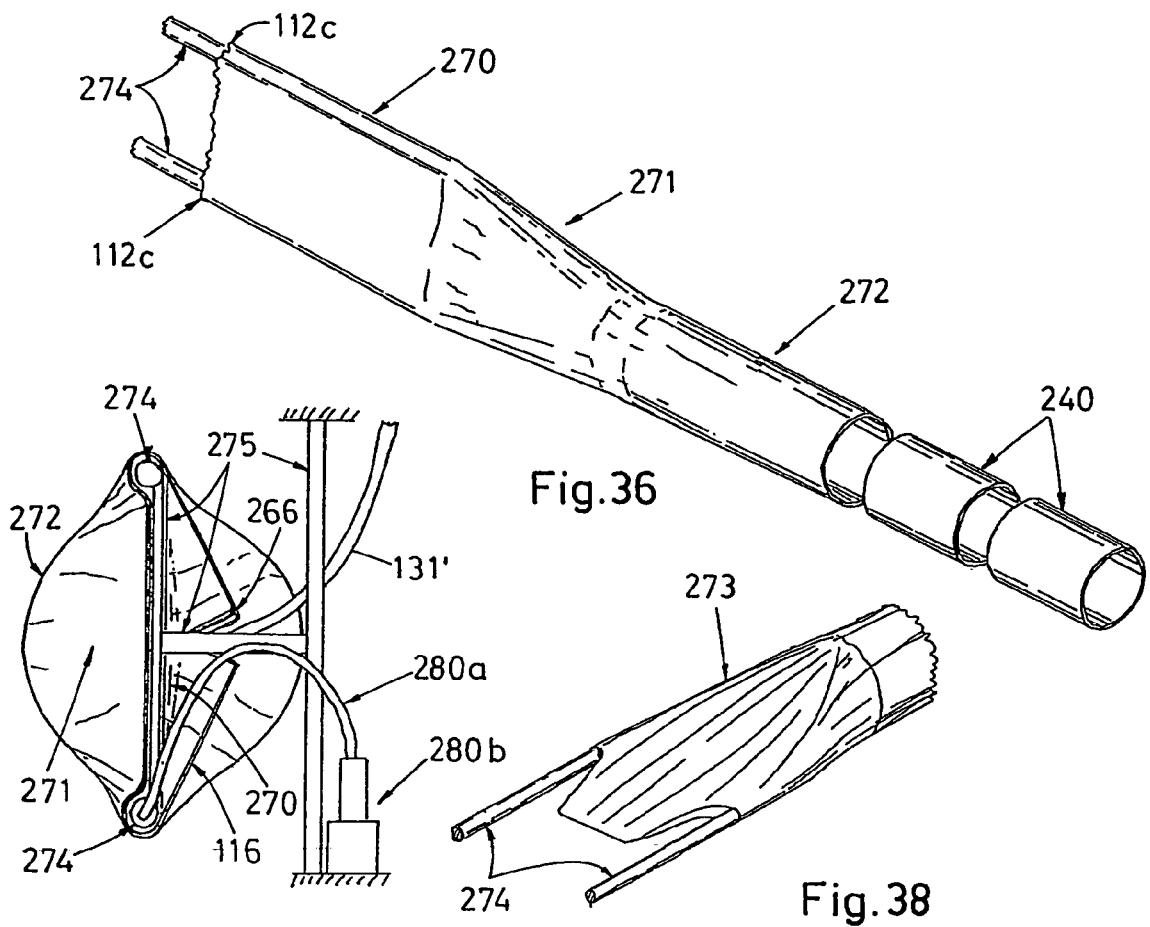
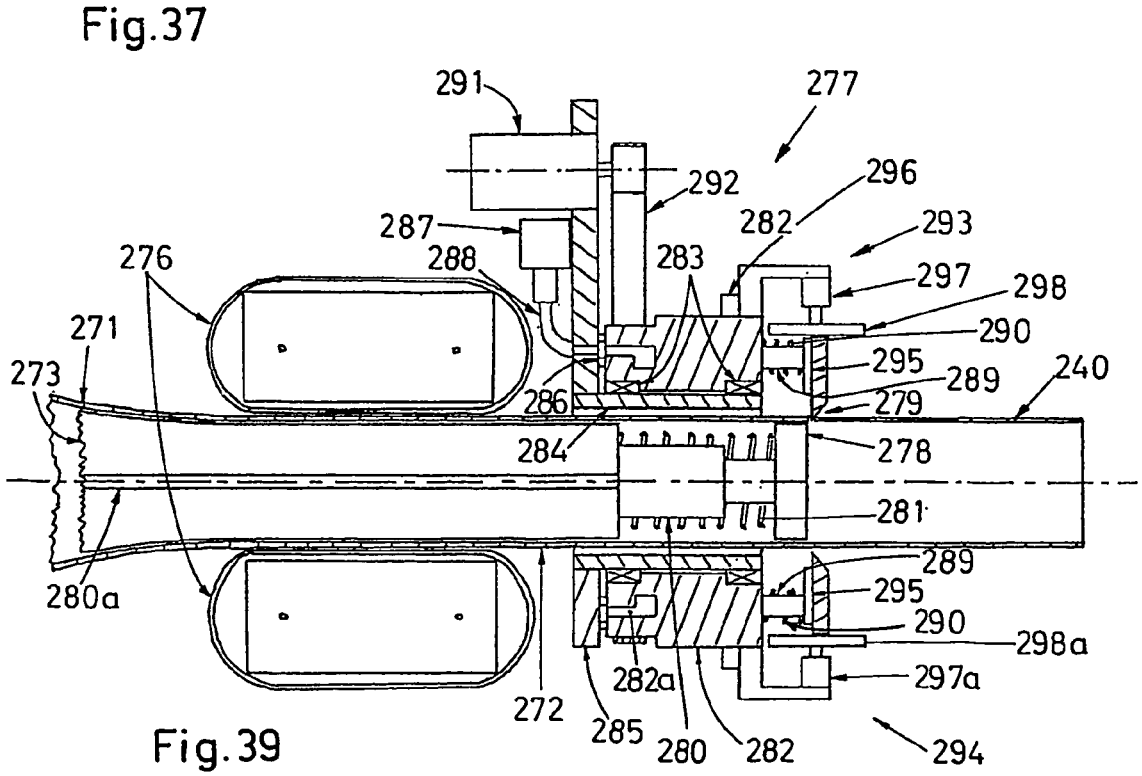

METHOD AND DEVICE FOR PRODUCING A CAN BODY AND CAN BODY

PRIORITY STATEMENT

This application is the national phase under 35 U.S.C. §371 of PCT International Application No. PCT/CH2005/000016 which has an International filing date of Jan. 15, 2005, which designated the United States of America and which claims priority on Swiss Patent Application number CH 54/04 filed Jan. 15, 2004 and PCT/CH2004/000368 filed Jun. 17, 2004.

FIELD

The invention generally relates to a method, to a device and/or to a can body.

BACKGROUND

Containers having metal walls and/or a jacket and bottom, particularly decorated aerosol cans, are embodied either by one piece or several pieces. In the case of one-piece aerosol cans made of aluminum, the cylindrical can body is produced with cold extrusion. Subsequently, a valve seat is formed at the open end by way of compressive necking down. This type of production process is very expensive due to the installation required for the many treatment steps as well as the water and energy requirements for cleaning and drying. The references U.S. Pat. No. 4,095,544 and EP 0 666 124 A1 describe the production of seamless steel cans, wherein a cylindrical can body is manufactured from a steel sheet coated with tin or plastic material by punching, pressing and ironing. It has turned out that enormous problems occur with forming restricted neck portions, because the structure of the material is changed and/or hardened by the ironing.

Also widely used are cans made from sheet steel for which the jacket has a longitudinal welding seam. The bottom and the upper closure are attached to the can jacket by folded seam connections. With folded seam connections sealing problems can occur which, for example, are reduced with the aid of sealing rings. With standard cans having extremely thin walls, problems occur with seals that are arranged on the end faces. To dispense with the sealing rings and to reduce the high material requirement for folded seams, it is proposed in WO 02/42196 to attach the lid of a filled beverage can by way of laser welding to the can jacket. For this, the upper edge of the jacket and the outer edge of the lid with identically aligned end faces are placed against each other, are welded together along the end faces, and rolled over to avoid sharp edged.

It is also possible to roll over only the outer edge of the lid or the jacket, so that the lid and/or the jacket fit on the outside and on the inside against the jacket and/or lid and the end face of one part is encircled by the reshaped edge of the other part. The finished connection therefore always has at least three material layers that fit against each other, thereby resulting in a high material use and appearance of the folding seam, which is undesirable for many uses.

References EP 200 098 A2 and EP 208 564 disclose additional embodiments of two-part and multi-part cans, for which a bottom or an upper closing part is attached by way of laser welding to the can jacket. The above-described laser welding seams between can wall and bottom and/or end piece do not permit a cost-effective production with sufficiently high piece numbers per time unit and/or result in unattractively formed connecting regions. With embodiments where the end faces of the can jacket and the closing part both are aligned and point toward the outside, sharp edges are created that interfere and must be folded or rolled over, thereby undesirably increasing the material consumption and, for many applications, creating an undesirable appearance of the folding seam.

Embodiments according to the EP 200 098 A2, for which a cylindrical bottom region must be joined by pushing together or overlapping to the cylindrical end region of the can material, could be produced only with sufficient material thicknesses and extremely high production and feeding precision. With extremely thin can material, a gap-free joining of the cylindrical regions and/or their end faces, which fit one into the other or which are joined to each other, is hardly possible because even small deviations in the circumference prevent a precise joining. If the two end regions, particularly the end faces, do not fit precisely against each other along a short partial section of the circumference, it is not possible to create a tight laser welded seam.

The device described in the EP 200 098 A2, where an expanding body is arranged inside the cylindrical can jacket, cannot correct the gaps in the circumference of the seam to be created and the associated areas where air can enter. During the expanding, the can material is reshaped by way of at least two mold parts that can be moved toward the outside, so as to assume a shape that corresponds to the outside edge of the form parts. In circumferential direction, spaces exist between the form parts in which the can jacket is not supported. This supporting surface, which is interrupted in circumferential direction, cannot safely ensure an air-free contact between the thin-walled cylindrical regions to be welded together. Closed seam lines between cylindrical joining regions for cans made from thin sheet steel therefore cannot be created precisely and such that they are sealed, or at least not with little expenditure and at high speeds.

In addition, the welded seam is not sealed on the can inside, so that corrosion cannot be ruled out, thereby restricting the can to the use of non-corrosive content. A further disadvantage is that a welding seam at the cylindrical can jacket harms the appearance of the can and/or requires a decoration to be subsequently affixed to the cylindrical outside can surface to cover the welded seam.

The known longitudinal welding seams, particularly the laser welded seams known from the EP 208 564 and U.S. Pat. No. 4,341,943, are provided with offsets and/or thickness differences in circumferential direction, which lead to problems when creating a neck portion or during the insertion of a bottom and/or an upper closing part. With these offsets, a tight seal and/or a tight connection to a closing part can be achieved only with difficulty. The offsets are also not desirable for aesthetic reasons and can lead to problems if the cans still need to be coated with a film. When welding together overlapping joining areas, the danger exists that the overlapping area and thus the circumference vary slightly. Expensive holding devices with end stops must be used directly at the welded seam for a precise overlapping, which can result in problems. With thin sheet metals coated with an anti-corrosion plastic coating on the inside, the coating is easily damaged through the welding operation and the corrosion protection is no longer ensured.

For aesthetic reasons and to mark the contents, a decoration is applied to the outside of the jacket surface. Imprinted films are affixed to the can body according to known solutions, so as to dispense with an expensive and inflexible direct imprinting of the can body. According to the EP 0 525 729, a decorative film is wrapped in peripheral direction directly around the can body and is joined to form a closed film enveloping the can body.

Removing a section of film and affixing it to the can body is very difficult with thin films and/or is connected to problems. Solutions are known from references U.S. Pat. No. 4,199,851, DE 197 16 079 and EP 1 153 837 A1 where a shrinkable flat plastic material is wound around a mandrel to form a closed sleeve, which is then pushed in axial direction as all-around label onto bottles or cans to be shrunk on. Pushing the all-around label over the bottles and/or cans carries the danger of deformation and damage, particularly with thin films. Besides the operational and frictional forces, friction-caused electrostatic charges and connected, variable electrostatic forces that act upon the film can occur, so that a fast transfer of the cylindrical, closed film is extremely problematic.

The known solutions for producing cans involve expensive installations. The cans therefore cannot be produced at the filling plants, which results in high transportation costs for transporting the empty cans from the can manufacturer to the filling plants. The known methods of forming can bodies with laser-welded seams are not suitable for can bodies that can be formed in many different ways from thin flat material and/or which comprise a large share of material in the joining regions, which projects toward the outside. According to prior art, the edge regions of thin can material cannot be joined with acceptable expenditure and air-free along the seam line.

SUMMARY

It is an object of at least one embodiment of the present invention to find a solution, which allows producing aesthetically attractive cans cheaply and in simple installations.

Can bodies are understood to include all containers, in particular aerosol cans and beverage cans, but also tubes and intermediate products in the form of containers.

It was discovered, during a first inventive step, that the welding joints between can jacket and a closure member arranged thereon should not be formed along edge regions that point toward the outside and/or not along edge regions where both end faces are arranged outside of the can inside. The end face of one of edge regions to be welded together is to be arranged outside of the can edge and the end face of the other edge region on the can inside. The welded joint between the can jacket and a connecting piece arranged thereon is formed with minimal material requirement as overlapping joint.

In a second inventive step, it was discovered that a welding seam that is formed between thin sheet metals can be formed especially efficiently and with the highest possible quality if the seam contact areas to be joined form a mutual end stop in the welding position. As a result, it is ensured that in the pressed-together state, no air is trapped between the contacting seam surfaces.

With an annular continuous seam between the closed can jacket and a closure member arranged lateral to the jacket axis, the seam contact surfaces are formed in the direction of the cylinder axis as necked down and/or expanding circular surfaces, which differ from the cylindrical shape. When pressing together the parts to be joined, a necked-down surface meets a correspondingly expanded closed surface, wherein both surfaces can be pushed together until the seam contact surfaces with the same circumference come to rest against each other. This position corresponds to a pushed together position where an air-free joining of the seam contact surfaces is ensured.

A third inventive step revealed that at least one edge region with seam contact surface is to be guided during the movement toward a mutual pushing together by a guiding surface that extends over the complete seam, wherein the guided edge region must be held against the guiding surface. This guided movement toward each other ensures an air-free contact between the seam contact surfaces once they are pushed together.

With an annular continuous closing seam between the closed can jacket and the closure member extending transverse to the jacket axis, the guiding surface is formed by the necked-down and/or expanded edge region of the one part. The edge region of the other part is the guided edge region, which is held against the guiding surface as a result of the force used to press together both parts, at least from a position shortly before reaching the contact position until the parts make contact. Once they are pushed together, the two parts can be tightly joined by way of an annular continuous welding seam.

According to one example embodiment, the longitudinal can seam for closing the can jacket is formed in the manner of a butt seam. For this, the edge regions on the side, which are to be joined, are guided along respectively one guide face, wherein these guide faces are oriented toward each other and extend over the complete length of the seam. So that the end faces of thin edge regions meet precisely, both edge regions are held against the partial guide faces. An exact meeting of the end faces of the two edge regions can be ensured by moving at least one edge region along the partial guide face toward the other edge region until they make contact. Once these regions are pushed together, the welding operation can be carried out.

So that no guide surfaces of the processing device need be arranged inside the can jacket, partial surfaces on the inside of the can jacket are used as guide faces. With a flat-pressed can jacket, for example, the regions arranged opposite the two edge regions to be joined on the can jacket can be designed to function as level partial guide faces. In the welding-seam region between the two guide faces, a recess leading away from the edge regions to be joined and/or a region projecting outward from the jacket is formed, so that a connection to the guide faces is avoided during the welding operation. The adjoining, level partial surfaces are connected via curved regions. So that no cracks or undesirable bulges are created in radial direction on the can jacket during the expanding of the flat-pressed can jacket, a form having a small radius of curvature but without folds is used in the flat-pressed state. The can jacket is essentially flat-pressed between the regions of curvature, so that a purposeful pressing together in at least one curvature region ensures the pressing together of the end faces during the welding operation.

Once the longitudinal can seam is formed, the flat-pressed can jackets can be stored or transported in a space-saving manner. Prior to attaching the bottom or an upper closure member, the can jacket is expanded in radial direction into a cylindrical shape and is provided at the end faces with end regions that are expanded or necked down in axial direction. In the expanded or necked down end regions, the bottom and the upper closure member are securely welded on.

The seam can be formed with the aid of different welding techniques, wherein a laser-welded seam is preferred. The flat material thus should comprise at least one metal seam that can be welded with a laser. In most cases, sheet steel materials are used which have good deformation characteristics and can be purchased with the desired thickness.

The basic material for producing closed can jackets with the aforementioned method can be either a flat material pulled from a coil or also sheets and/or plates. When plates are used for the production, sections having the dimensions of a can jacket must first be cut off. The flat-pressed can jacket with the two curved regions can be produced from these sections by pressing it into a mold and folding over of the edge regions which must be moved toward each other. When processing the strip-shaped flat material, two notches perpendicular to the strip axis are first formed if necessary in the flat strip. The notches are arranged such that following the reshaping of the strip, they are located in the curved regions of the flat-pressed, endless can jacket. As a result, when cutting off the desired can jacket sections, any cutting can be confined to the flat-pressed region. Reshaping elements are used for the reshaping steps, wherein these act upon the continuously advancing strip material. The longitudinal seam can be created either on the successively passing sections or the continuous strip material.

If necessary, the can jacket sections can be cut with a saw from the strip material, for which a saw blade or a saw belt moves along with the produced can tube during the sawing operation. The cutting device is retracted following the cutting of a can tube section. Owing to the short sections and/or the small can heights, known cutting devices have disadvantages because they cannot cut and move back quickly. A further disadvantage of the known cutting devices is that particularly during the cutting of thin-walled tubes, there is danger of deformation and thus jamming. In addition, known cutting methods create shavings which would require further cleaning steps and/or create problems during the following can production stages.

According to reference DE 1 452 556, a quick and clean cutting operation is ensured if the flat-pressed can jacket-strip material with pre-notched curved regions is moved along on a support, which can cooperate with a cutting edge. As soon as the desired length of the tube section is advanced, the cutting edge is moved in a cutting motion through the adjoining wall regions of the tube. During this cutting process, no shavings are generated and the cutting operation is extremely fast.

In the search for an alternative process for cutting can jackets from a continuous wall material created by way of a longitudinal welding seam, a solution was discovered which is new and inventive, regardless of the connection between the can jacket and a closure member. With this solution, a support edge is provided on the inside of the continuously formed can jacket-strip and/or the wall material. The support edge is essential closed in circular direction, extends in a normal plane relative to the longitudinal axis of the wall material, and fits directly against the inside of the wall material. At least one cutting tool is assigned to this support edge, preferably a cutting ring, wherein the tools are turned eccentrically to the cutting edge during the cutting operation. Thus, at least one cutting region is rotated once around the wall material and a section of the wall material is cut off in the process.

During the cutting operation, the support edge and the cutting ring and/or the cutting element move along with the wall material. After the cutting operation, the cutting ring and/or the cutting elements are moved to a concentric position relative to the support edge and, together with the support edge, moved in the direction of the longitudinal axis and, counter to the wall material movement, back to the starting position occupied prior to the cutting operation, such that another cutting operation can be realized. The cutting ring can be rotated continuously for this cutting and retracting operation. The cutting ring must be moved with correct timing from the concentric to the eccentric position.

Since the wall material is flat-pressed during the welding of the longitudinal seam, an expansion element must be arranged between the welding device and the support edge on the inside of the wall material, which reshapes the flat-pressed wall material to the circular cross-sectional shape of the support edge. The expansion element can be fastened to two holding rods, which are guided along the curved regions on the side of the flat-pressed wall material. These two holding rods extend from the expansion element to a region in which the wall material is not yet closed, thus making it possible to connect the rods with holding parts on the outside of the wall material. The support edge is positioned in such a way on the expansion element that it can be moved in longitudinal direction, wherein the support edge movement is coupled to the longitudinal movement of the cutting ring.

With this new cutting solution, pre-cut notches in the strip material can be dispensed with. The solution furthermore allows a deformation-free cutting even with extremely thin flat material.

If the starting material—the plates or the strip—is provided with a decorative film and/or an inside film, the film can be cut together with the stabilizing part of the can jacket during the cutting operation of the open or closed jacket sections. As a result, no separate cutting of thin film pieces is required.

If the inside film is applied to the sheet metal prior to the forming of the longitudinal seam, an inside film that is damaged in the region of the welding seam can be supplemented through additional processing steps, so that a complete corrosion protection is ensured. For this, a covering tape is arranged on the strip material or the plates in the region of the above-mentioned indentation between the two partial guide surfaces. Following the welding operation, the indentation with the covering tape can be pressed against the welding seam and affixed thereon in such a way that it is sealed on both sides to the intact inside film.

According to a different embodiment, a tape and/or an elongated bulge of sealing material that can melt is applied prior to the reshaping and welding of the longitudinal seam to at least one side edge region of the can jacket-flat material. Following the reshaping of the flat material and the forming of the welding seam, this bulge is heated until it is partially melted and flows, so as to bridge the region between the side edges of the inside film. This bridged area completely covers the welding seam on the can inside, thereby preventing corrosion in the region of the seam inside. The elongated bulge preferably consists of thermoplastic polyester. The melting point of the preferred material is, for example, in the range of 150 to 220° C.

With the circular, closed welding seams between the can jacket and the bottom and/or the upper closure member, an anticorrosive material should be provided, if necessary. Experiments have shown that a bottom and/or a closure member on the side facing the can inside can be provided with a sufficiently thick plastic coating, so that this plastic coating remains at least partially in place during the welding operation. The welding is realized from the outside and leads to a melting of the metallic seam region of the can jacket with corresponding metallic seam region of the bottom and/or the closure member. The plastic coating in the welding region is at least in part vaporized. Having a thicker inside coating already ensures that a minimum coating will remain. If the inside coating extends over the end face of the bottom and/or the closure member, there is no direct contact on the can inside with the metal following the completion of the can body, thereby ensuring the corrosion protection without further measures.

Analog to sealing the inside of the longitudinal seam with a material that melts and flows over the seam, preferably a thermoplastic polyester, it is also possible to seal the annular seam between the can jacket and a closure member with the same type of material and using the same processing steps.

For this, a circular bulge of a sealing material that melts is applied along the outer edge region of the closure member. Once the annular welded seam is formed, the circular bulge is heated up to a partial melting and flowing, so as to bridge the area between the inside coating of the closure member and the inside film of the jacket. This bridging material completely covers the end face of the edge region positioned inside the can and, if necessary, also the welding seam on the can inside, so as to prevent any corrosion in the area of transition from can jacket to closure member.

Following the above-described insertion of the can bottom and, if applicable, an upper closure member, the can body still may not have the desired final form. However, since the laser welding seams can be easily deformed, the desired end form can be obtained, for example with the aid of an expanding step inside an external mold. During the expanding step, the cylindrical jacket region, which is slightly less wide then the outer edge of the bottom and/or the upper closure member, is expanded by way of an excess pressure build-up on the can inside. If necessary, the reshaping to match the inside shape of an external mold can be realized as described in EP 853 513.

In addition to the expanding step, it is possible to use a molding ram and press from the outside against the can bottom. The outside shape, the expanding step and, if necessary, the molding step are realized such that a desired can form is created. In the process, the seam between the can bottom and the can jacket can be displaced, for example, from the original position at the lower edge of the can jacket to the bottom region. With aerosol cans, the transition from the jacket to the bottom is usefully designed with a curvature radius which corresponds to a standard shape used for aerosol cans for the transition from the can wall to the can bottom. An upper closure member in the form of a valve seat on aerosol cans makes it possible to obtain a typical end shape for aerosol cans during the reshaping. In addition, the mold can also be used to impress three dimensional decorating elements in the jacket region.

Mechanical reshaping devices can also be used, if applicable, because the necessary reshaping forces can be relatively high, at least in the area of transition from jacket to a closure member. However, a reshaping device with elastically deformable, liquid-impermeable hose element is particularly advantageous. This hose element is connected to a liquid feed-in and is filled at least partially with liquid. During the reshaping of the can body in an external mold, the hose element that is inserted into the can body is pushed from the inside against the can body under the pressure of the fed-in liquid. In the process, the can body is pressed against the external mold.

With the above-described method, a standard can is produced as intermediate product and is then reshaped into the desired final form by using a molding step and/or an expanding step. To produce the intermediate product, the same plant can be used for all cans with approximately the same diameter and essentially the same height. The respective mold needs to be used only during the expanding step to obtain the final can shape. A change from one can shape to another requires very little expenditure for the changeover.

It is understood that in order to combine the can jacket and a bottom and/or an upper closure member, the jacket end faces must be expanded or necked down and the joining regions of the bottom and/or the closure member can be correspondingly expanded or necked down. If the necking down of the jacket already corresponds to the desired can shape in this region, it may be possible to dispense with the expanding step following the welding step. If the can bottom is fitted from the can inside against the necked down section and is welded on, only the necked down section of the can wall toward the support surface is visible when a can is sitting on a support surface. The inserted can bottom cannot be seen. The can thus can take the appearance of a block-shaped aluminum can in the region of the can bottom.

It has turned out that the expanding step can advantageously be realized prior to forming a circular welding seam between the can jacket and a closure member. In the process, the can jacket is reshaped into the desired final form. The two end faces of the can jacket are simultaneously necked down to the required shape. Subsequently, a can bottom and an upper closure member are pressed against the can jacket and the two circular welding seams are realized in the process. The finished can then has the desired final form. The correct reshaping of the jacket prior to attaching the closure members is reduced to a single reshaping step, which can be carried out without problems and with less force, even at the end faces. A separate forming of the end regions of the welding seams is no longer required. The external mold can have a desired structure, which appears on the can in the form of projections and/or depressions. It has turned out that for most applications, a diameter expansion of 4 mm is sufficient and that the desired decorating structures and the necking down of the end faces, necessary for the welding seams, can be created with this small expansion.

Owing to the fact that no material-hardening treatments are carried out for producing the can jacket, a necking down technique such as a compressive necking or spin-flow necking which is known from prior art can be used at the upper end of the can jacket. This necking down can be carried out until a valve seat is formed. Preferably, the necking is carried out only until a closing part with the valve seat can be arranged so as to form a seal on the upper necked-down end. If necessary, the joint is formed as folded connection, preferably as welded joint and in particular as laser welding joint. The use of a closing part with valve seat ensures the production of cans with extremely exact valve seat while using a simple production method.

If necessary, a base covering is inserted such that it covers the joint between the can jacket and the can bottom. The base covering preferably consists of a flat plastic material. It is understood that flat material with at least one metal layer can be inserted as well, in particularly material with an aluminum or steel layer or also a cardboard layer, wherein the stabilizing layer can furthermore be coated with plastic. The inserted flat materials are intended to ensure a robust base covering which is not damaged on the conveying devices of the filling plant and remains as stable as possible even when positioned on wet surfaces. The base covering can be provided with a sealing layer, so that it can be securely sealed along the bottom. In place of a sealed joint, a snap-in connection or a welded connection, in particular having at least three laser welding points, can also be formed to attach the base covering. If a magnetizable base covering is used, can bodies of non-magnetic material can also be conveyed on magnetic conveyors.

The film used for a can body with decorated film is imprinted on the outside and/or front side or on the side facing the can body and/or the backside. With a transparent film that is imprinted on the back, the film protects the print layer, so that the decoration is not damaged by friction. A transparent film that is imprinted on the back can be provided with a sealing layer following the imprinting, which also ensures a secure sealing connection through the print layer between the film and the can jacket material.

It may be advantageous if the print layer on the film back essentially assumes the function of a primer and the remaining decoration is imprinted on the front of the film. The reference to a primer means, it can be a single-tone basic color but also be a part of the decoration, for example the planar color and/or image design. The strip of film, which is pre-printed on the back in a first print shop, is imprinted in a further printing step on the front side. This additional printing step can be carried out, if necessary, by the can manufacturer and/or in a second print shop to apply specific decorating information. For example, it means that for each basic decoration, inscriptions can be applied in a further print step which may be different for the various marketing areas. For the imprinting of the front, optional printing techniques known from prior art can be used, if necessary followed by surface treatments carried out after the printing steps.

With the previously described, new production steps, beverage cans or beverage bottles can also be produced from laser-welded flat material. With beverage cans, for example, embodiments are of interest, where the lid provided with a pull-tab is inserted prior to the filling. It can therefore be viewed as bottom during the production. The other closure member for the can comprises a filling opening, which can be sealed tightly with a closing element following the filling operation. The closing element can be crimped tightly or pressed in. So that the can closure member with the closed filling opening forms the bottom of the filled can, wherein its central region somewhat projects toward the can inside and an outer circular region forms the standing surface for the can. A beverage can of this type does not have a folding joint between the lid and the jacket, thus keeping the material requirement for the joint low.

BRIEF DESCRIPTION OF THE DRAWINGS

The drawings explain the solution according to the invention with the aid of example embodiments, which shows in.

DETAILED DESCRIPTION OF THE EXAMPLE EMBODIMENTS

Figure 1D:
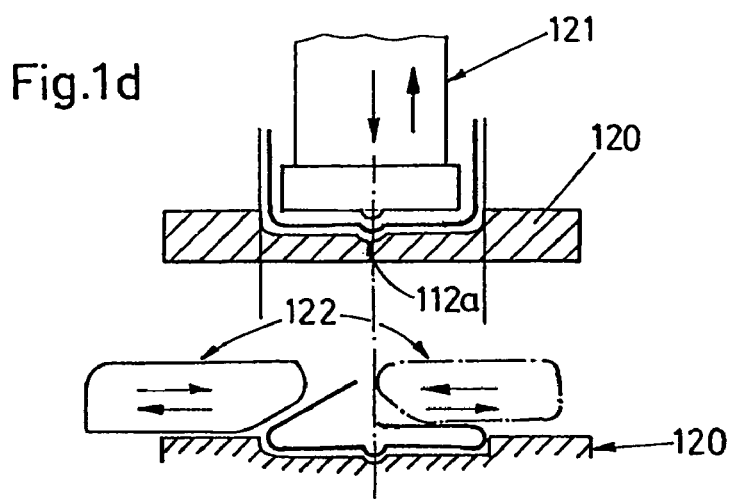
FIG. 1a a schematic view from above of a device for cutting strips from plates.
FIG. 1b a schematic lateral view of a device for applying films to both sides of the strips, FIG. 1c a schematic view from above of an installation component, which cuts sections from strips and reshapes these into flat-pressed can jackets, FIG. 1d two schematic cross-sections of treatment steps for reshaping sections into the shape of flat-pressed can jackets FIG. 2 a schematic view from the side of an installation which covers strip-shaped flat material on both sides with film and which converts the strip material continuously into the shape of a flat-pressed can jacket, FIG. 2a a view from above of the flat material following the notching step, FIG. 2b a schematic cross-section in the region of the reshaping elements for reshaping the strip-type material into the shape of the flat-pressed can jacket, FIG. 3 a cross-section through the flat-pressed can jacket, FIG. 4 a schematic cross-sectional view of the step of applying a covering tape, FIG. 5 a schematic cross-section of a device for laser welding the longitudinal can seam, FIG. 6 an enlarged detail from FIG. 5, FIG. 7 a schematic view from the side of an installation part for laser welding the longitudinal seam, for pressing on the covering tape, and for cutting and conditioning closed can jacket sections, FIG. 8 a cross-section of a device for pressing on the covering tape, FIG. 9a a frontal view of a device for expanding the flat-pressed can jacket into a cylindrical shape, FIG. 9a a view from above of a device according to FIG. 9a, FIG. 9c a frontal view of a device for expanding the flat-pressed can jacket into a cylindrical shape, FIG. 9d a schematic view of a device for expanding the can jacket at the ends, FIG. 10a a detail of a section through the upper closure member and the can jacket with adjoining necked-down and/or expanded edge regions, FIG. 10b a detail of a section through the bottom element and the can jacket with adjoining, necked-down and/or expanded edge regions, FIG. 10c a schematic longitudinal section through a device for laser-welding two closing seams, FIG. 11 a longitudinal section through a device for expanding the can jacket and pressing in the can bottom, wherein the two partial representations show the situation before and after the expansion, FIG. 12 a schematic representation of the can shape before and after the expanding step, FIG. 12a an enlarged detail of the joint between can jacket and upper closure member, FIG. 12b an enlarged detail of the joint between can jacket and bottom element, FIG. 13 a section through the edge region of the flat material for a closure member, FIG. 14 a detail of a section through the valve seat on an aerosol can with inserted valve, FIG. 15a a view from above of a beverage can, FIG. 15b a longitudinal section through a beverage can with the pull-tab inserted prior to the filling and with sealable filling opening, FIG. 16 a view from the side of a beverage bottle, FIG. 17 a section through the joining region between bottom and jacket, FIG. 18a a vertical section through a can jacket with bulging sections at both end faces, FIG. 18b a vertical section through a car body with bulging sections on the can jacket, and fixedly welded closure members, FIG. 19 a vertical section through an aerosol can, including an upper closure member and a valve, FIG. 20 a part of a vertical section through an aerosol can with upper closure member containing a valve, FIG. 21a a longitudinal section through a cylindrical can jacket, FIG. 21b a longitudinal section through a device for expanding the can jacket in an external mold, FIG. 21c a can jacket formed through expanding, FIG. 22a a longitudinal section through an external mold, FIG. 22b two detailed views from FIG. 22a, FIG. 23 a schematic view from the side of a monitoring station for welding the can bottom and the upper closure member to the can jacket, FIG. 24a, FIG. 24b a longitudinal section through a can body before and/or after the welding, FIGS. 25, 27a, 27b detailed views of the joining region between can jacket and upper closure member, FIGS. 26a, 26b, 28a, 28b detailed views of the joining region between can jacket and can bottom, FIG. 29 a section through the flat material for the can jacket when a sealing bulge is applied, FIG. 30 a frontal view of a roll set for reshaping the flat material, FIG. 31 a frontal view of a roll pair for creating an indentation, FIG. 32 a frontal view of a roll pair for the partial folding over of the side edge region of the flat material, FIG. 33 a frontal view of a roll set and a laser welding device for welding the longitudinal seam, FIG. 34 cross-sectional views through closed can jacket strips for cans having different cross sections, FIG. 35a, 35b details from a cross section through a can jacket strip, with sealing bulge for the longitudinal seam, FIG. 36 a perspective representation of the can jacket strip during the process of expanding and cutting off individual can jackets, FIG. 37 a frontal view of the can jacket strip during the closing, welding, and expanding steps, FIG. 38 a perspective view of an expanding element for expanding the can jacket strip, and FIG. 39 a longitudinal section through a cutting device for cutting off the individual can jacket sections.

FIG. 1a shows a cutting device 101 with cutting elements 102, which takes the form of a rotating shaft that is arranged in bearings at both ends. The cutting elements 102 can be positioned spaced apart, at distances corresponding to the desired can circumference. If plates of flat metal material are conveyed through the cutting device 101, strips 103 are created for the width corresponds to the can circumference and the length to at least a can jacket height.

FIG. 1b shows a unit for applying films to both sides of the strips 103. The strips 103, which essentially follow each other directly, are moved along a treatment axis. A coil 104 of the decorative film 106 is positioned directly above the strips 103. A heating device 107 heats the strips 103 to the temperature required for sealing the films 105, 106. Two contact rolls 108 and respectively one sealing layer on the films 105 and 106 ensure a firm connection between the films 105 and 106 and the strips 103. For a further treatment of the coated strip sections, a film-cutting device 109 is provided which severs the films 105 and 106 between the strips 103 either mechanically or, if applicable, with the aid of heat.

FIG. 1c shows a part of the installation, comprising a cutting device 101 for cutting the strips 103 into sections 110 and reshaping these in a first reshaping device 111a into flat-pressed can jackets 112.

For the embodiment according to FIG. 3, the flat-pressed can jacket 112 has a recess 112a in the area of the center line, with two flat center regions 112b at both sides, an adjacent curved region 112c, and two flat edge regions 112d which can be pressed onto the flat center regions 112b. The can jacket is closed by way of laser welding at the pressed together end faces 112e.

According to FIG. 4, a covering tape 113 is arranged in the region of recess 112a in the flat-pressed can jacket 112. The covering tape 113 is placed with the aid of a feeding device 114 onto the inside film 105, preferably immediately after or along with the feeding of the inside film 105.

FIG. 2 shows an embodiment for which the flat-pressed can jackets 112 are continuously formed and also welded together as strip-type material, so that the individual can jackets 112 are cut off only at the end. From a roll containing flat material 115, strip-type flat material 116 is fed to a notching device 118 with the aid of a supply device 117. The notching device 118 forms two notches 118e perpendicular to the axis of the strip-type flat material. During the reshaping into the flat-pressed jacket shape, these notches 118e reach the two curved regions 112c so that, when cutting off the can jacket sections, the flat material must be cut only in the flat region between the radii of curvature. Any cutting of the curving region would result in folds that could not be completely flat-pressed.

In the following device unit, films are applied to both sides of the flat material 116, wherein the strip-type flat material 116 is moved along a treatment axis. A roll 104 of inside film 105 is positioned above the flat material 116 and a roll of the decorative film 106 is arranged below the flat material 116. A heating device 107 then heats the flat material 116 to a temperature required for sealing the films 105, 106. Two contact rolls 108 and respectively one sealing coat on the films 105 and 106 ensure a firm connection between the films 105 and 106 and the flat material 116. Two contact rolls 108 and respectively one sealing coat on the films 105 and 106 ensure a secure bond between the films 105 and 106 and the flat material.

The flat material 116, coated on both sides, is continuously reshaped in a second reshaping device 111b, in transverse direction to the strip axis, into a flat-pressed, closed shape, whose cross-section corresponds to the embodiment according to FIG. 3. The second reshaping device 111b comprises, for example, successive roll pairs, which bend the edge regions on the side of the flat material 116 more and more towards the center. FIG. 2b shows an example of a roll pair 119. Prior to bending the side edge regions, the recess 112a is formed in the center of the flat material 116 by way of a cooperating roll pair.

According to FIG. 1d, flat material in the form of sections is reshaped into the shape of a U with recess 112a by using a reshaping mold 120 and a complementary first reshaping tool 121. By way of two laterally acting additional reshaping tools 122, the side regions are completely bent over. To flatten the center region, a first reshaping tool without depressing projection, which is not shown herein, and with a smaller width is again pressed onto the jacket section.

The laser welding of the longitudinal can seam is effected on the flat-pressed can jacket strip in the same way as for the individual can jackets. The successively individual can jackets are preferably fed successively to a welding device, so that the welding device is able to form the welding seam substantially continuously in a similar way as on the can strip.

Figure 5:
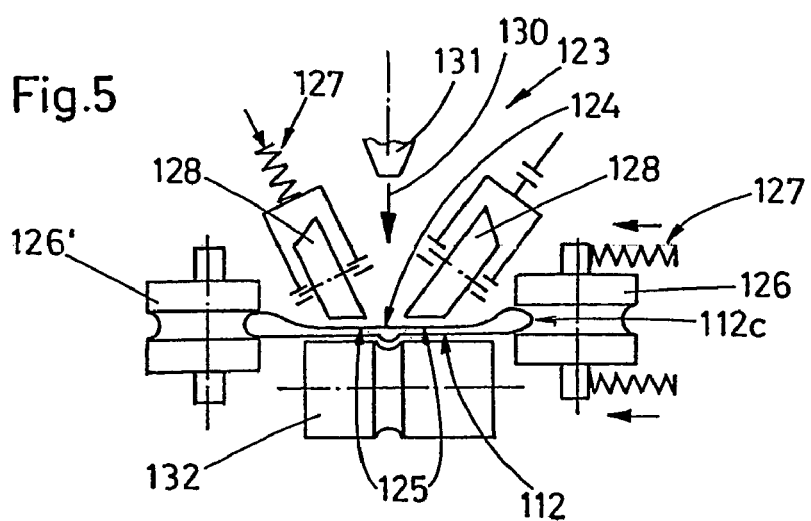
Figure 6:
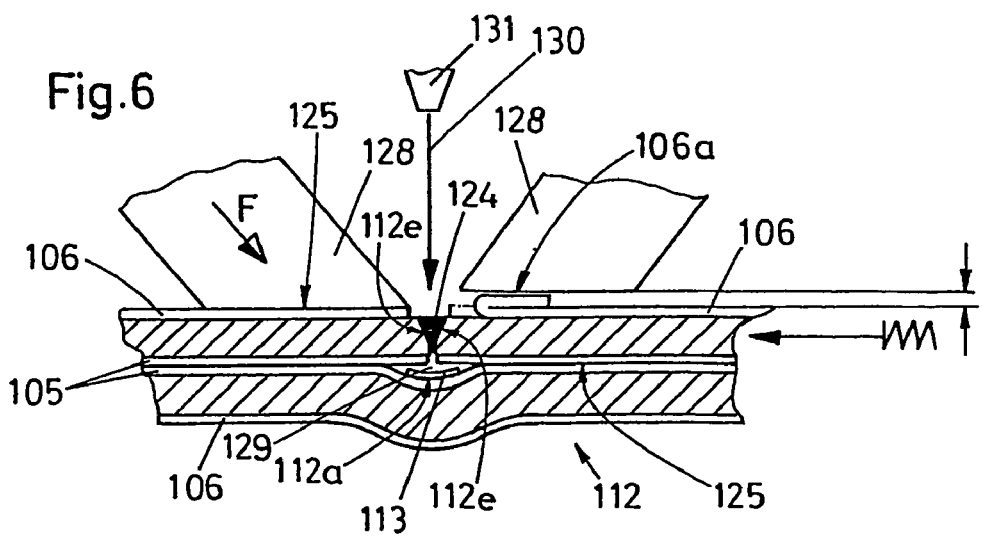

FIGS. 5 and 6 show a first welding device 123 for laser welding the longitudinal can seam 124 at the pressed-together ends 112e of a flat-pressed can jacket 112. The side regions 125 to be joined of the flat material rest on both sides of the recess 112a on a flat center region of the inner rim of the can jacket, which functions as a partial guiding surface 112b. In the illustrated embodiment, the two partial guiding surfaces 112b are formed on the inside of the can jacket.

The can jacket 112 has a closed, flat-pressed shape, wherein the adjoining partial surfaces are connected during the welding by curved regions 112c. One of the contact rolls 126 arranged on the side presses one edge region 125 against the other edge region 125 by, by way of a pressing device 127, thereby ensuring the pressing together of the side faces 112a. To hold the two edge regions 125, pressed against a joint end stop, on partial guiding surfaces 112b, holding rolls 128 are arranged in such a manner that they hold the two edge regions 125 of the side faces 112e on the partial guiding surfaces 112b. One of the two holding rolls 128 is pressed by way of a pressing device 127 against one of the edge regions 125. The flat-pressed can jacket 112 is always supported by a support roll 132 in the area of the holding roll 128. The other holding roll 128 is held by way of an adjustment device at an adjustable distance to the other edge region 125. A laser beam 130 from a laser source 131 is used for the welding operation.

To prevent any damage to the decorating film 106 during the welding of the longitudinal seam 124, the decorating film 106 can be arranged on the flat material 116, 103 in such a way that it does not reach all the way to the end face 112e at one of the edge regions 125, but projects over at the other end face 112e at the other edge region 125. The projecting film region 106a in one edge region of the flat material 116, 103 is not sealed to this region, so that this exposed film edge 106a can be folded over and away from the region of the longitudinal seam 124 before this longitudinal seam 124 is formed. Following the welding operation, the exposed film edge 106a according to FIG. 8 can be placed over the longitudinal seam 124 and sealed on. As a result, the longitudinal seam 124 is covered completely on the outside. Since the laser-welded seam is extremely narrow, a covering by the decorating layer can be omitted, if necessary. To prevent corrosion of the seam, some covering material can be applied.

To ensure complete corrosions protection, inside film 105 that is damaged in the region of the welding seam 124 is covered by the covering tape 113. A small clearance space 129 between the end faces 112e and the covering tape 113 ensures that it is not affected by welding. After the welding procedure, the recess 112a with the covering tape 113 may be pressed against the welding seam 124 and may be fixed thereon in such a way that it is firmly sealed at both sides to the intact inside film 105. Since the covering tape does not comprise a sealing layer at the side facing the inside film 105 in the recess 112a, it may be transferred at the longitudinal seam 124 to the inside film 105.

FIG. 7 shows guiding devices 133 in addition to the holding roll 128 and the supporting roll 132. Two pressing rolls 134 are used for the firm sealing of the projecting film area 106a and the covering tape 113, as shown in FIG. 8. The heat necessary for sealing is provided in some cases by the longitudinal seam 124, or is supplied from outside. In an installation with a can jacket strip, the can jacket sections are cut in a cutting device 135, preferably comprising rotating cutting edges. The closed, flat-pressed can jackets 112' are fed, for example, from the top into a conditioning device 136, where they are maintained during a specified period with the aid of supplied warm air 137 until a lasting connection is created between the metallic flat material and the decorative film 106 or the inside film 105. The closed, flat-pressed can jackets 112' discharged at the bottom may be used for producing can bodies directly following a storage period, or after a transport.

Figure 9A:
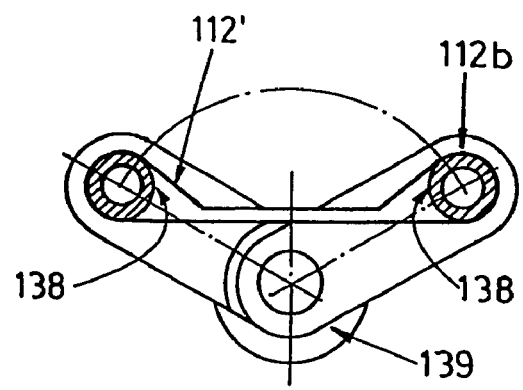
Figure 9C:
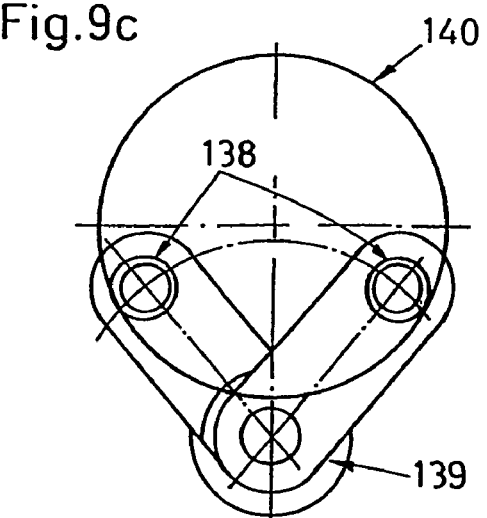
Figure 9B:
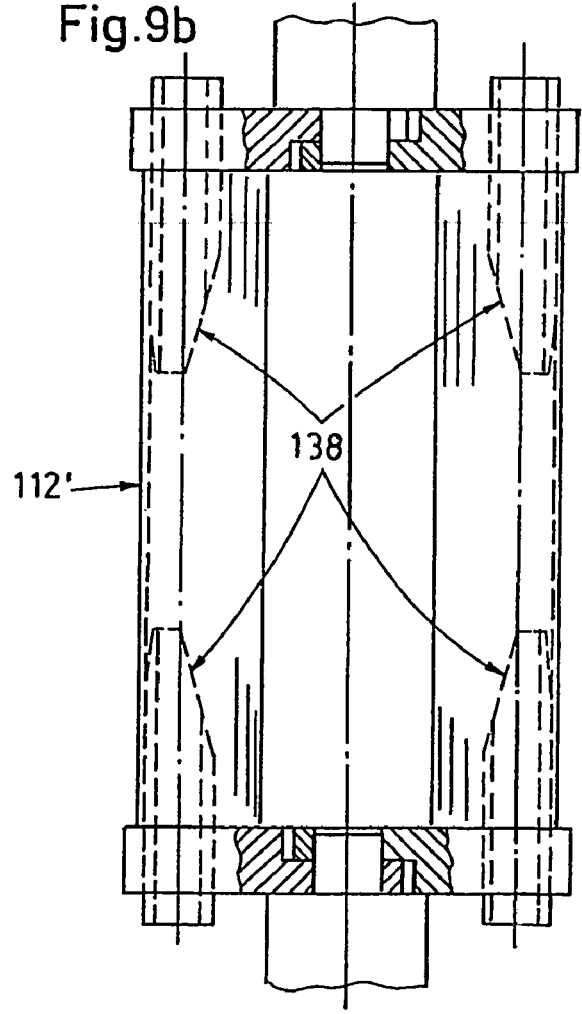

FIGS. 9a and 9b show a closed, flat-pressed can jacket 112', which is expanded in radial direction into a circular, cylindrical form prior to attaching a bottom or an upper closure member. The reshaping from the flat-pressed to the circular cylindrical form is realized mechanically, if necessary, but preferably by using compressed air. For this, compressed air lances 138 are inserted from both end faces into the curving regions 112b of the closed, flat-pressed can jacket 112'. By way of a compressed air jolt, the flat-pressed, closed can jacket 112' can be reshaped into a circular cylindrical can jacket 140, as shown in FIG. 9c. During the reshaping operation, the relative position of the compressed-air lances 138 is also changed. For this, the compressed-air lances 138 are arranged on pivoting guides 139.

Figure 9D:
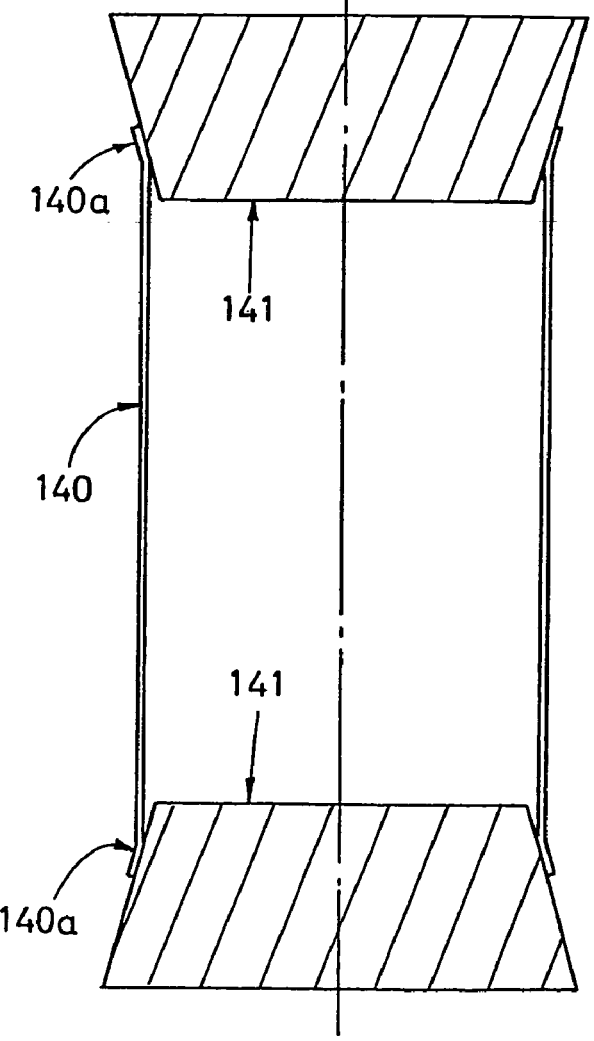
Figure 10C:
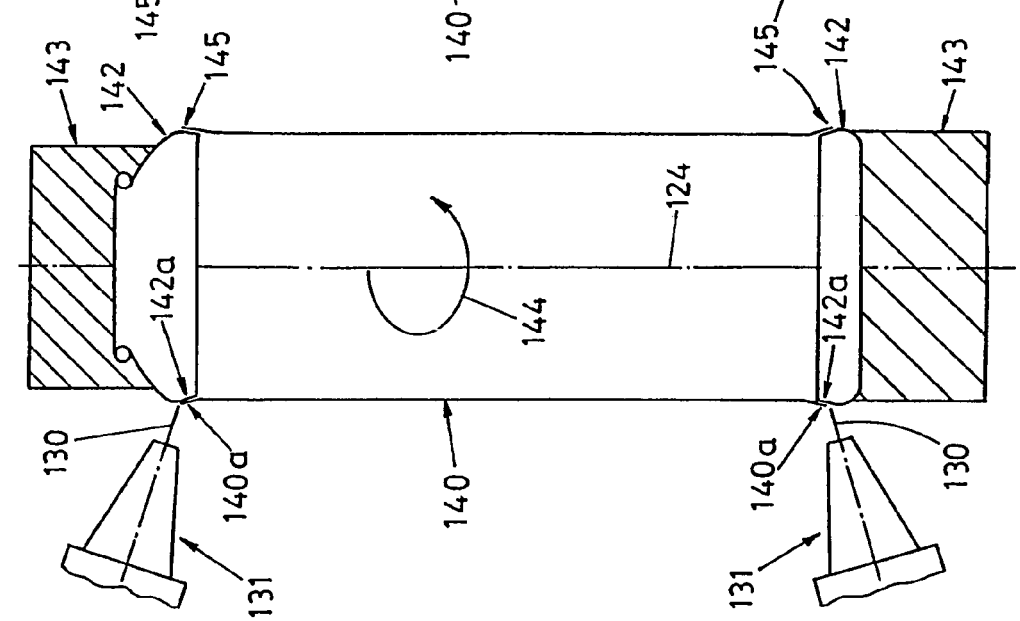
Figure 10A:
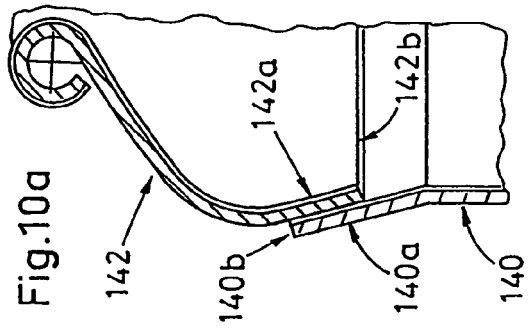
Figure 10B:
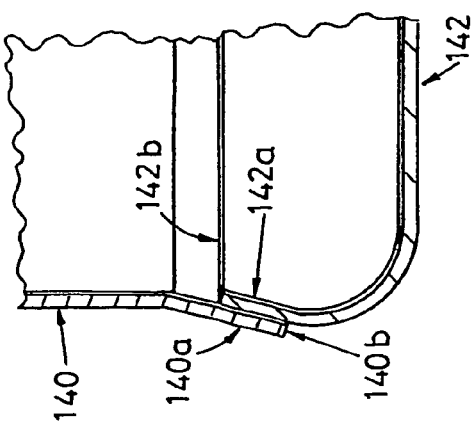

FIG. 9d illustrates how the circular cylindrical can jacket 140 is expanded only insignificantly at both end faces. The end face expansion is achieved with expansion tools 141. Each expanded end face can be used as edge region 140a for the joining to a closure member 142, shown in FIGS. 10a, 10b and 10c, provided the closure member 142 has correspondingly formed edge regions 142a. The seam contact surfaces of the can jacket 140 and the closure member 142 are located in the non-cylindrical circular, closed edge regions 140a and 142a, which are expanded or necked down in the direction of the can axis.

FIGS. 10a and 10b show that during the compressing of the parts 140 and 142 to be joined, a necked-down edge region is pressed against a correspondingly expanded, closed edge region 142a and/or 140a, wherein one of the end faces 142b, 140b of the two edge regions 142, 140 is fitted against the can jacket inside and the other one against the can jacket outside. For the embodiment shown herein, the end face 140b of can jacket 140 is located on the outside. The two edge regions 142a, 140a are moved toward each other until they make contact. In the process, the closed edge region 140a of can jacket 140 forms the guide surface that extends along the complete closing seam to be formed. The corresponding conical embodiment of the compressed edge regions 142a and 140a ensures that the two seam contact surfaces fit air-free against each other, thus making it possible to generate a tight laser seam even if the flat material is extremely thin.

According to FIG. 10c, two closure members 142 are pressed with a welding holder 143 against the end faces of the can jacket 140. During the rotation 144 of the welding holder 143, a ring-shaped, closed seam 145 is formed (see FIG. 12) on both end faces of the can jacket 140 with the aid of respectively one laser beam 130 from respectively one laser source 131. According to the embodiment shown, a closure member 142 in the form of a can bottom is inserted at the bottom and a closure member 142 in the form of a neck portion with valve seat is inserted at the top. It is understood that it is also possible to insert only one closure member 142 or differently shaped closure members 142.

The can body created as shown with FIG. 10c substantially corresponds to an aerosol can, wherein the two finishing seams 145 in the wall region are visible. With cans that must meet high requirements as to the appearance, the lower closing seam 145 should less visible. The upper closing seam should be in a region that is covered by the valve closing part or the lid. The can body can be reshaped into a desired form because a laser seam is deformable.

Figure 11:
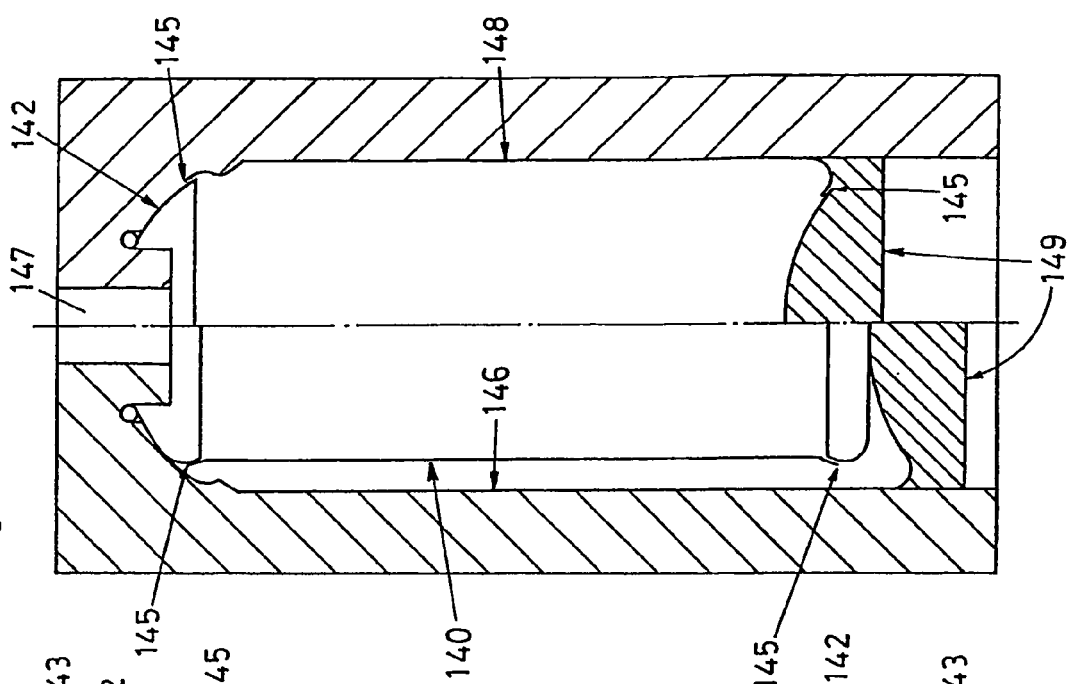

FIG. 11 shows a simple reshaping solution with many design options. The desired final form is achieved with an expanding step in an external mold 146. For this, a compressed fluid, preferably compressed air but possibly also fluid, is injected through an opening 147 into the can inside. The flat material of the can jacket 140 and the closure members 142 is expanded due to the inside pressure and is reshaped until a can body 148 forms that completely molds against the external mold 146. The normally used sheet steel with affixed decoration and inside film and/or the plastic coating is easily expandable and can be reshaped with relatively low forces because it is not very thick, wherein the coating remains unaffected by the reshaping.

If necessary, pressure is applied from the outside with a molding plug 149 in addition to the expanding of the can bottom. The external mold 146, the expanding step and, if necessary, the step of applying pressure from the outside are realized to obtain the desired can shape. For the embodiment shown herein, the seam between the can bottom and the can jacket 140 is moved from its original location at the lower edge of the can jacket 140 to the bottom region. The transition from the jacket to the bottom is formed by a curvature radius, which corresponds to the common form of aerosol cans in the area of the transition from the can wall to the can bottom. It is understood that in place of the bottom curvature shown, a flat or outward bulging form can be selected as well. The upper can end is provided with a final form that is typical for aerosol cans. In addition, the shape used could also comprise plastic decorating elements in the jacket region. In this way, a multitude of different forms can be achieved with little expenditure. Since the change from one form to another only requires a change in the external mold 146, an extremely high flexibility with little expenditure is achieved with the new production method.

FIG. 12 shows the can shape before and after the expanding step. The conical embodiment of the edge regions 140a and 142a, used for an optical welding, as well as the final seams 145 are positioned after the expanding step in those regions of the can body 148 where they no longer present optical detractions. The circumferential indentation 150 can be used for holding an upper closing part, for example a lid. The valve seat 151 is formed onto the closing part and is subsequently not deformed again, so that it is extremely precise.

According to FIG. 13, the starting material for the closure member 142 comprises a metal layer 152, an inside coating 153, and an outside coating 154. The inside coating extends across the end face 142b. For this, an edge region of the thick inside coating is pressed around the end face with the aid of a thermal pressing operation, if necessary, after the punching out of a disc of coated sheet metal. Subsequently, the closure member 142 is produced through deep drawing from the completely coated disc.

FIGS. 12a and 12b show that with the upper and lower closing seam 145 and following the welding operation, a continuous inside coating can be ensured. The inside coating 153 is selected thick enough, so that a tight coating remains even after the welding operation. By pressing the inside coating 153 completely around the end face 142b, this end face fits directly against the inside film 105 of the can jacket 140. The outside coating only is interrupted at the finishing seam 145, which does not interfere since this region can be covered by an upper covering element for high aesthetic requirements.

FIG. 14 shows a different advantage of the thick inside coating 153 of the upper closure member 142. A connecting region 155 of the valve can be mounted directly to the valve seat 151, without having to insert a seal, because the inside coating 153 functions in the manner of a seal.

The processing steps described with the aid of FIGS. 9a to 11 are realized, for example on revolving stations with rotary tables, wherein the can jackets and/or the can bodies are transferred via a transfer table to the rotary tables and are processed during the continued rotation. For the further transport they are subsequently moved via a different transfer table away from the rotary table. The closure members are supplied to the can jackets via feeding devices and are firmly pressed against the jackets. The described processing devices are assigned to corresponding rotating regions of the rotary tables. A welding beam is guided via a light conductor to the processing locations on the rotary table. The rotary table holders for welding the finishing seams are preferably provided with rotary drives, so that closed welding seams can be formed during the rotation of the can jackets.

It is understood that the upper closure member can also comprise different types of openings in place of the valve seat, for example a neck with thread or even a pull-tab closure. Owing to the fact that a folding region for formed crimped or folded joints can always be dispensed with, the required amount of material for the upper closure member is always considerably less than for the known solutions.

The above-described method and installation make possible an efficient production of various can bodies as well as tubes. FIGS. 15a, 15b and 16 show additional embodiment, which can be produced efficiently with the new method.

FIGS. 15a and 15b illustrate a beverage can 156 for which prior to the filling a lid 157 with pull-tab 158 is inserted and welded with a closing seam 145 to the can jacket 140. The lid can be viewed as the bottom during production. A closure member 159 for the filling is also welded onto the can jacket 140 and comprises a filling opening 160, which is closed off tightly with a closing element 161 following the filling. The closing element 161 can be crimped securely or simply pressed in. So that the can closing element 159 with the closed filling opening 160 can form the bottom of the filled beverage can 156, its center region projects somewhat toward the can inside and an outer ring-shaped support region 159a forms the standing surface for the can. If necessary, the filling can closure 159 extends on the outside essentially across the complete bottom surface, thereby forming a base covering that is securely sealed especially at the closure member 159 for filling the can. The described beverage can 156 does not have a folded joint between the lid and the jacket, thus minimizing the material requirement for the joint.

FIG. 16 shows a beverage bottle 162 of flat material with a metal coating. A closure member in the form of a substantially flat bottom 163 is welded onto the bottom of the can jacket 140. At the top of the can jacket 140, a neck part 164 with threaded opening 165 is attached by way of a closing seam 145.

FIG. 17 shows an enlarged detail of the transition from can jacket 140 to can bottom 163, wherein the inside is provided with a continuous inside coating 153, 105 and the outside with a decorative film 106 as well as an outside coating 154. As a result, a good corrosion protection is ensured on the inside and on the outside. If necessary, the closing seam 145 is also coated on the outside with plastic, so that no corrosion can occur. The closing seam 145 is optionally covered by the base covering, which is preferably affixed to the outside of the can bottom 163, so as to form a seal.

The above described beverage cans 156 and the beverage bottles 162 can be provided with a multitude of shapes during the expanding step, in the region of the can jacket as well as at the transition to the can bottom. With the inventive production method, it is easy to produce metal cans, which substantially match the forms of standard PET bottles. However, the waste problem is noticeably lower as compared to PET bottles because the plastic coating can be extremely thin and because sheet steel corrodes, thereby allowing the can body to decay over the long term.

FIG. 18a shows a can jacket 24 having ring-shaped bulges 60 which point radially outward from both end faces 24a and 24b. At the bulging sections, a cross-sectional restriction is created towards the respective face 24a, 24b. The bulging sections 60 are formed with the aid of two shaping rolls 61a and 61b, which complement each other and are respectively arranged on the outside and the inside of the can jacket 24. While the can jacket 24 is turned past the shaping rolls 61a and 61b, the inside shaping roll 61a may be pressed outward and towards the outer shaping roll 61b, until the desired bulge 60 has been formed. With a bulge 60, a shoulder 60a is established at least on one face 24a, 24b of the can jacket 24 without a necking step. As compared to necked-down sections, the problem of creating expanded sections is less problematic and they can be produced with good quality. Thus, with a small expenditure, a shoulder 60a of a good quality is obtained.

According to FIG. 18b, closure members, for example a can bottom 31b or an upper closure member 31a, are pressed against the shoulders 60a at the bulges 60. A firm and tight connection is formed with a connecting seam 42 in the form of a laser-welded seam. The can bottom 31b is preferably welded first. The can jacket can be formed prior to or, optionally, after welding the upper closure member 31a, for example by expanding the can cross-section at least to the diameter of the at least one bulge 60. Shaping tools, such as rolls, may be inserted into the can interior for enlarging the can jacket 24 before welding the upper closure member 31a. If necessary, a fluid under pressure is introduced into the interior of a can for expanding the can cross-section and the can jacket 24 pressed into a mold inside.

Figure 19:
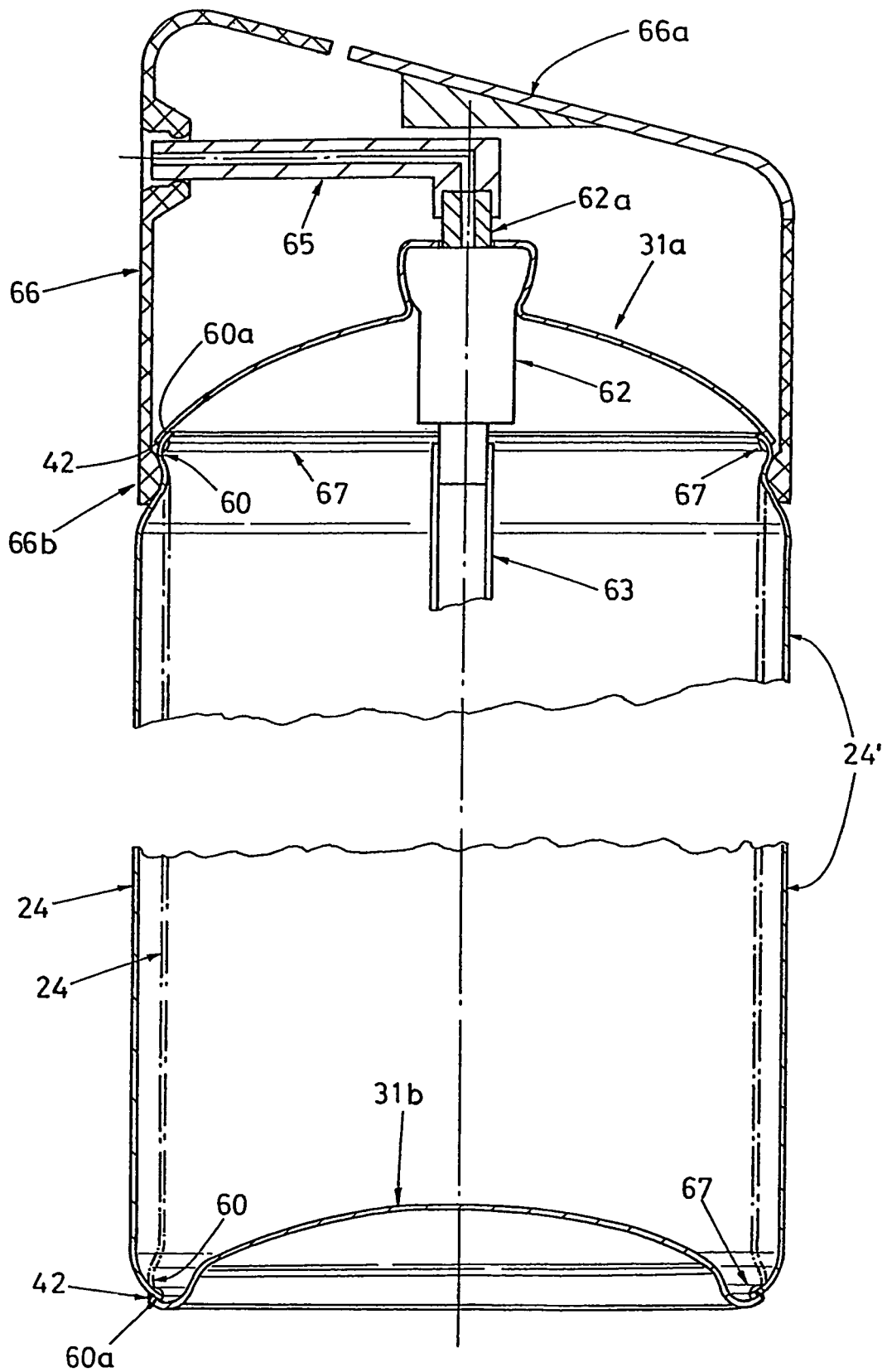

FIG. 19 shows an aerosol can 24' produced by using a cylindrical can jacket 24 with bulges 60. A can bottom 31b has been arranged at a lower shoulder 60a. The outer edge region of the can bottom 31b is adapted to the shoulder 60a so that the outer edge of the can bottom 31b fits tightly against the shoulder 60a when being compressed, thus enabling the formation of a precise and tight laser-welded seam as joining seam 42. The can jacket 24 is enlarged from a first cylindrical shape to a second shape before putting the upper closure member 31 a on top. In the process, desired surface structures may be obtained. For expanding the can jacket 24, shaping tools such as rolls can be inserted into the can inside. Preferably, a fluid is introduced under pressure into the can inside and the can jacket 24 is pressed against the inside of a mold, for example as disclosed in Patents EP 853 513 B1, EP 853 514 B1 and EP 853 515 B1. The bulge 60 on the upper face 24a is preferably left in its original shape so that a dome-shaped upper closure member 31a can be pressed against the shoulder 60a, and can be welded on by a joining seam 42.

The upper closure member 31a comprises a valve 62 from which a hose 63 leads to the can bottom 31b, and which can be actuated by a small output tube 62a. An output part 65 that is slipped onto the small output tube 62a is held in a cap 66. To actuate the valve 62, an actuation area 66a of the cap 66 is pressed onto the output part 65. In the process, the small output tube 62a is pressed downward and the valve opened. The cap 66 is held by way of a latching portion 66b in a corresponding latch on the can jacket 24. The latch on the can jacket 24 is formed, if necessary, by the bulge 60 or a necked-in region between the bulge 60 and the expanded region of the can jacket 24. Optionally, the latch or snap-in part can also be formed by the outer rim of the upper closure member 31a or by the connecting seam 42.

The cap 66 covers the upper closure member 31a and, together with the can jacket 24 which preferably comprises a decorative film, ensures an attractive appearance that corresponds to that of a one-piece aluminum can. Also possible are embodiments for which the can jacket 24 and the can bottom are integrally formed, or for which the connecting seam 42 between the can jacket 24 and the can bottom 31b is covered by a base covering. Even if the connecting seam 42 is visible on the can bottom, it is hardly visible as a thin laser-welded seam. The connecting seam 42 is optionally sealed with a coating to prevent oxidation.

To ensure a continuous coating on the can inside as well, the can jacket 24, the can bottom 31b and the upper closure member are provided on the inside with a protective layer in the form of a film or of a coating. Optionally, sealing material 67 is arranged so as to encircle the connecting seams 42 to ensure a continuous sealing layer even after the connecting seams 42 are formed. So that coatings do not interfere with the laser welding, the contacting parts in the region of the laser seam may be treated prior to the laser-welding operation by using a laser for removing the coatings. The inside coating is thereby not affected.

FIG. 20 shows the upper portion of an aerosol can 24' where the can jacket 24 is joined at a necked-down face 24a to a dome-shaped upper closure member 31a by way of the connecting seam 42. The can jacket 24 is optionally enlarged from a first cylindrical shape to a second shape before putting the upper closure member 31a on top, for example to obtain desired surface structures. The closure member 31a comprises a valve 62 from which a hose 63 extends to the can bottom 31b and which can be actuated by a small output tube 62a. A spraying head 64, slipped over the small output tube 62a, comprises a discharge channel 64a and a cap 64b. The cap 64b extends radially outwards and axially towards the upper closure member 31a, preferably far enough so that the connecting seam 42 is substantially covered and the upper closure member 31a is not visible. Of the aerosol can 24', only the can jacket that comprises a decorative layer and the spraying head 64 are visible.

Independent of the precise form of the welded parts, welding the upper closure member 31a onto the valve 62 is very advantageous since the welding on of the upper closure member 31a prevents micro-leakages. The aerosol can 24' is filled prior to putting on the spraying head 64 through the discharge tube 62a.

Figures 21A, 21B, 21C:
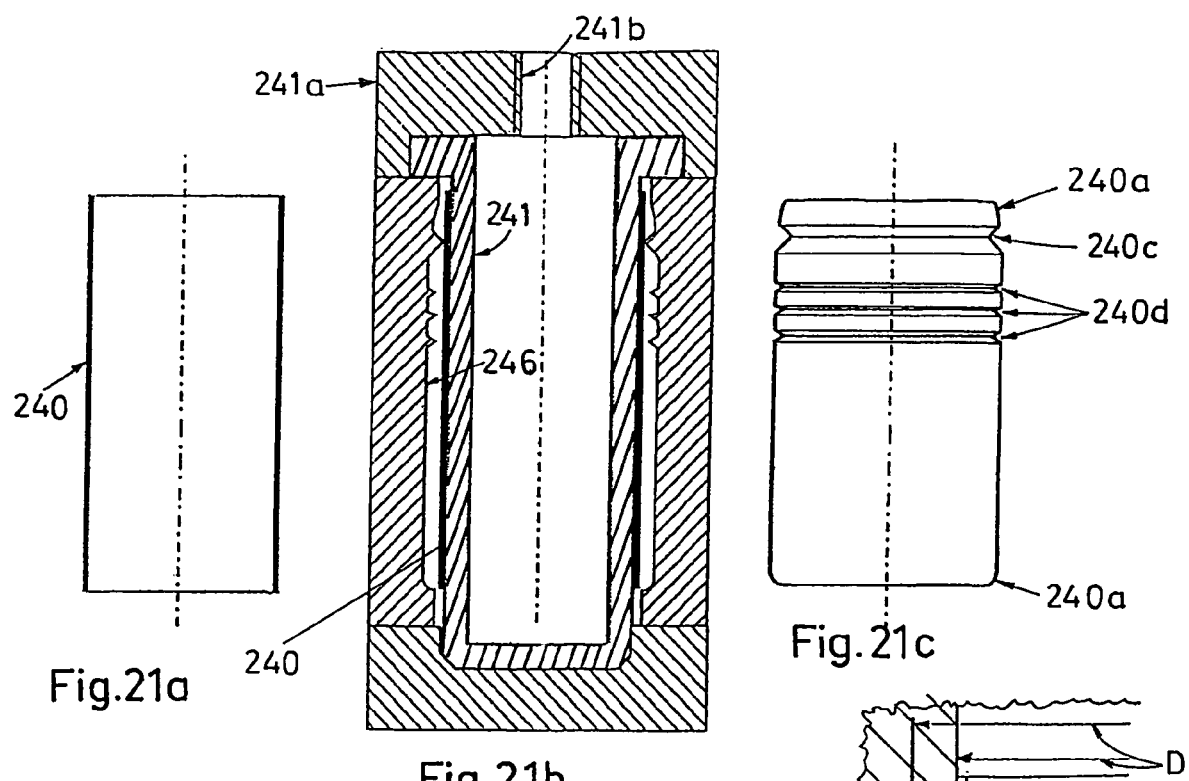

FIG. 21a shows a cylindrical can jacket 240, which is inserted into an external mold 246, as shown in FIG. 21b, and is pressed during the expanding step from the inside against this mold 246. The expanding step is preferably realized before a closure member is inserted and thus prior to the welding of the closing seam because it allows an unobstructed deformation even of the end faces. The deformation can also be realized following the insertion of a closure member, but this is more difficult, especially near the closure member. During the expanding step, at least one but preferably two edge regions 240a are formed on the end faces. So that only one reshaping step is needed, the edge regions 240a are necked down toward the end face following the expanding step, wherein the curvature is substantially selected based on the desired curvature for the transition from the can jacket to the closure member. During the expanding step, an engagement area 240c for the can lid and in particular for the decorating structure 240d can be formed.

Seam contact surfaces that are adapted to the closure members 242 are thus formed onto the can jacket 240 prior to the welding of the closing seam 245. For the welding of a closing seam 245, the can jacket 240 and at least one closure member 242 are pushed against the edge regions 240a, 242a until they meet, wherein one of the end faces of the two edge regions 240, 142 is located on the inside and one on the outside of the can body 248. The closing seam 245 is formed when two seam contact surfaces fit against each other with no air trapped in-between.

Figures 22A, 22B:
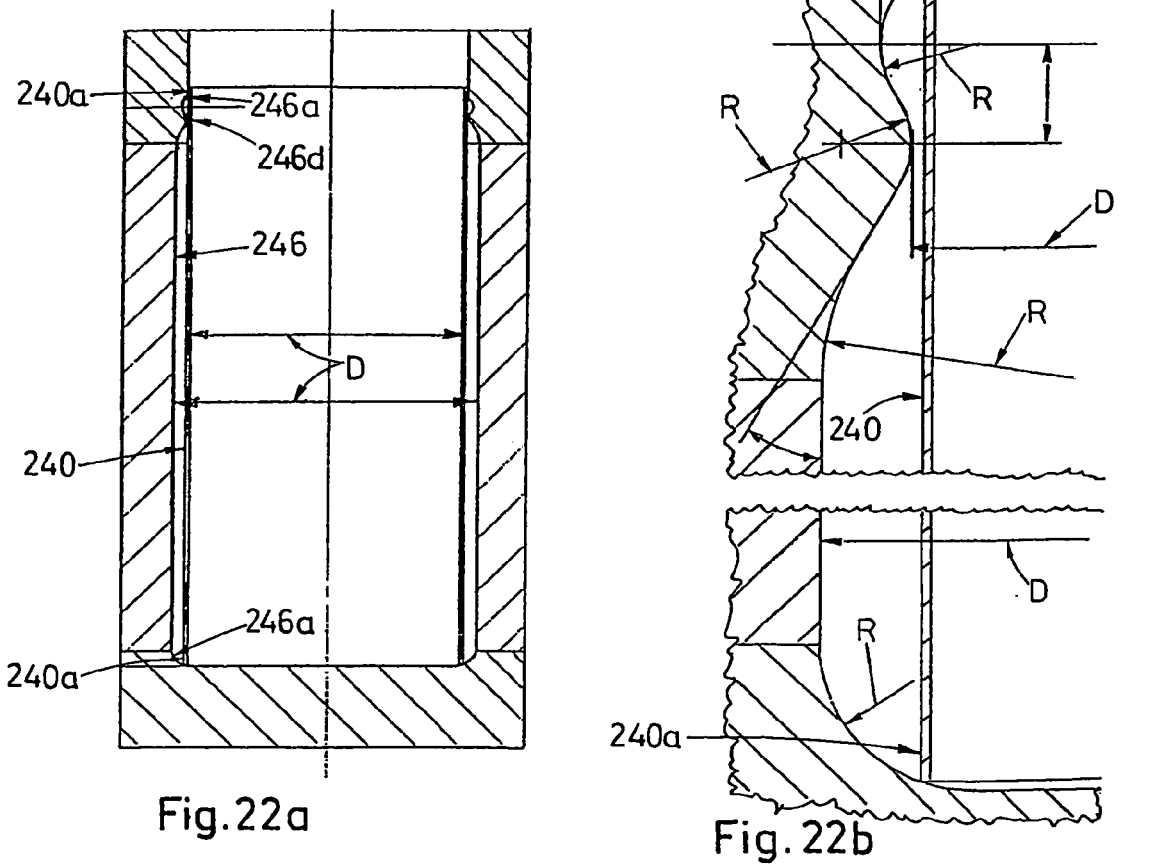

FIGS. 22a and 22b show an external mold 246 with edge regions 246a and an engagement region 246d. The curvature radii R and the diameters D are selected based on the desired shape. Starting with a cylindrical can jacket 240, different types of can shapes can be produced by selecting a corresponding external mold 246. It has turned out that even with a maximum diameter increase of 6 mm, preferably 4 mm, most desired can shapes can be obtained.

Following the insertion of the can jacket 240 into the external mold 246, the can jacket 240 can be reshaped to match the external mold shape 246 by generating an excess pressure on the can inside. The expanding to match the external mold 246 would also be possible with mechanical expanding elements such as rolls or expanders. However, a solution as detailed in FIG. 21b is preferably selected, for which a hose element 241 that can be expanded with pressurized liquid is arranged inside the can jacket 240, is pressed together with the can wall 240 against the external mold 246 as a result of feeding in the pressurized fluid and, following the release of the pressurized fluid, is again removed from the can jacket 240. The hose element 241 is attached to a closing part 241a with fluid feed-in 241b. The fluid feed-in 241b is connected to a non-depicted pressure source.

FIG. 23 shows the welding of two closure members 242 to a can jacket 240, for which the edge regions were formed out in the external mold 246. With a welding holder 243, the two closure members 242 are pressed against the end faces of the can jacket 240. During the rotation 144 of the welding holder 243, an annular closing seam 245 is formed at both end faces of the can jacket 240 with respectively one laser beam 230 emitted by respectively one laser source 231. According to the example embodiment shown, a closure member 242 in the form of a can bottom is inserted at the bottom of the cylindrical can jacket 240 and a closure member 242 in the form of a neck portion with valve seat is inserted at the top. It is understood that only one closure member 242, or also differently formed closure members 242, can be inserted. The resulting can body corresponds to an aerosol can.

According to FIGS. 24a and 24b, it is also possible to produce cans with special appearance. For this, two closure members 242 are welded to a can jacket 240 with a closing seam 245, as shown in FIG. 21c. An outer base covering 242' is then arranged on the can bottom, preferably sealed on tightly.

FIG. 26a shows an embodiment where the closing seam 245 is covered by the base covering 242', thereby preventing the oxidation of the closing seam 245 and creating an aesthetically pleasing can. As seen from the outside, the transition from can jacket 240 to can bottom corresponds to the shape of an aerosol can of aluminum. The lower edge region 240a of the can jacket 240 forms a necked-down seam contact surface toward the end face 240b. The edge region 242a of the closure member 242 is expanded toward the end face 242b. The contours of the two edge regions 240a and 242a are adapted to each other in such a way that the can jacket 240 and the closure member 242 meet in an end stop, wherein the two parts fit air-free against each other along the closing seam 245. With the can jacket 240, the edge region 240 transitions to the cylindrical jacket region via an offset and a small area of curvature. The offset is selected such that it can accommodate the edge region 242a of the closure member and the base covering 242'.

FIG. 25 shows a transition from the can jacket 240 to the upper closure member 242 where an engagement region 240c for the can lid and/or the cap 66 is embodied. The cap 66 with the snap-in region 66b engages in this engagement region 240c. The transition from the can jacket 240 to the upper closure member 242 is embodied with a small offset and the adapted edge regions 240a, 242a, such that the external shape of the mold corresponds to that of a standard aerosol can of aluminum. The closing seam 245 is formed in the air-free contact region between the can jacket 240 and the closure member 242.

The edge regions 240a and 242a can be formed with extreme precision. The edge region 240a of the can jacket is formed to match the external mold. The closure member 242 and thus also its edge region 242a, is preferably shaped with a precise pressing tool.

FIG. 26b shows an embodiment that corresponds to the bottom shape of beverage cans, wherein a base covering is dispensed with. The alignment of the edge regions 240a and 242a differs less markedly from the cylindrical shape than for the embodiment in FIG. 26a.

The embodiments according to FIGS. 27a, 27b, 28a, 28b show embodiments which makes it possible to ensure a continuous inside barrier of plastic. For this, an inside film 205 is arranged on the inside of the can jacket 240. The inside of the closure member 242 comprises an inside coating 253. During the laser welding of the closing seam 245, the inside film 205 may be destroyed in the seam region. To be able to seal the seam region and the end face 240b of can jacket 240 from the inside, a circular sealing bulge 266 is applied to the closure member 242.

Following the welding of the closing seam 245, heat is supplied to the sealing bulge region, so that the sealing bulge material starts to flow and cover the end face 240b and, if necessary, also the seam region. At the end of the flowing stage, the sealing bulge material cools down and/or is not longer heated, so that it solidifies and forms a continuous sealing bridge 267 between the inside film 205 and the inside coating 253 of the closure member 242, which extends in particular also across the sealing seam 245. To ensure a controllable flow, the material of the sealing bulge must have the desired flow properties at the desired temperature. If necessary, the can body is rotated around the longitudinal axis to improve the flow properties. In the process, it may be useful to align the can axis such that at least a portion of the face 240b to be covered and the closing seam 245 are at the lowest point of a vertical longitudinal plane.

A decorating film 206 is preferably arranged on the outside of the can jacket 240. The closure member 242 in particular comprises an outside coating 254. The contacting seam surfaces are preferably not coated for the welding of the closing seam 245. To prevent unsightly oxidation on the can outside, the closing seam 245 is covered in circular direction with a coating material, if necessary, such that the coating material extends from the external coating 254 to the decorating film 206. When fitting on a base covering 242' or a fixedly attached cap 66, the additional coating of the closing seam can be omitted.

Figure 29:
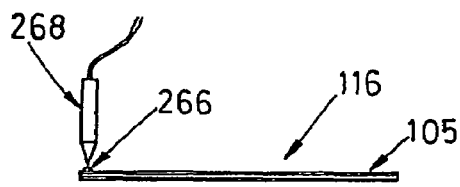

FIG. 29 shows flat material 116 where a sealing bulge 266 is applied with an application device 268 along at least one of the two side edges prior to the reshaping and welding of the longitudinal seam. Following the welding of the longitudinal seam 124, the material of the sealing bulge 266 is to be applied to the longitudinal seam 124 in such a way that it is joined tightly to the inside film 105 on both sides of the longitudinal seam 124. The material for the sealing bulge 266 is a coating device, which permits completing the inside barrier, in the same way as the covering tape 13. The at least one sealing bulge 266 is melted on so as to flow and such that the longitudinal seam 124 is covered by the material of the sealing bulge.

Figure 30:
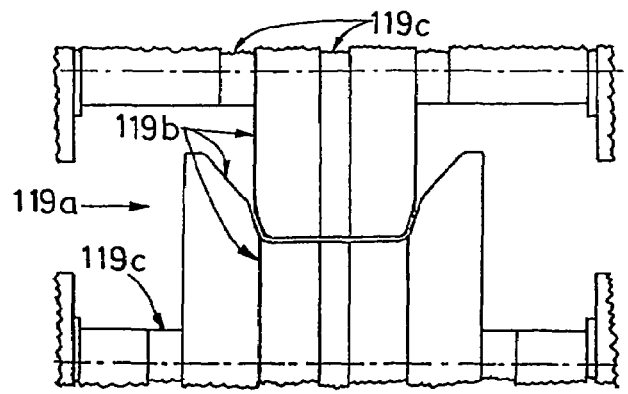
Figure 31:
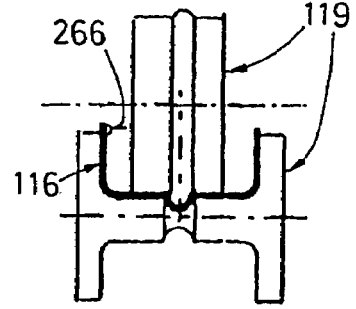

FIG. 30 shows a roll set 119a for a second reshaping device 111b (FIG. 2). To adapt the second reshaping device with little effort to the different can diameters, the roll set 119a is composed of shaping rolls and spacing rolls. The shaping rolls 119b form a defined line of curvature in the flat material 116, while respective distance rolls 119c are used for different can diameters. According to FIGS. 31, 32, and 33 additional shaping rolls 119 reshape the flat material 116 into the closed, flat-pressed form.

Figure 32:
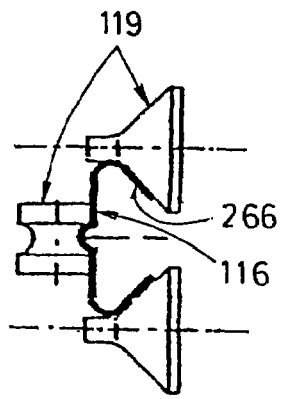
Figure 33:
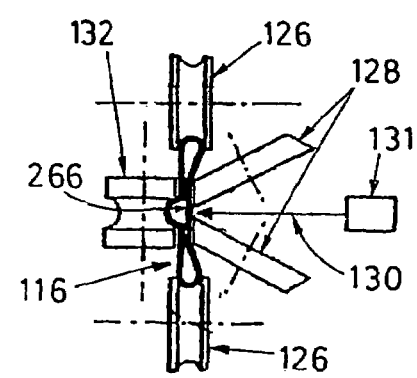
Figures 35A, 35B:
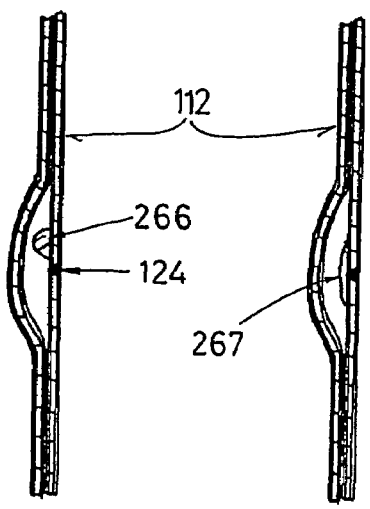

So that the material for the sealing bulge 266 can be applied with little expenditure to the longitudinal seam 124 (see FIG. 5), following the welding of the longitudinal seam 124, the flat material 116 and/or the can jacket strip according to FIGS. 32 and 33 is rotated by 90°, so that the sealing bulge 266 extends directly across the longitudinal seam 124 on the flat-pressed can jacket strip, as shown with FIG. 35a. The material of the sealing bulge can then be made to flow by supplying heat. The flow properties are selected such that following the flowing operation, the material extends across the longitudinal seam 124 as continuous sealing bridge 267, as shown in FIG. 35b. If necessary, the can jacket strip is oriented and reshaped, such that the longitudinal seam 124 is positioned in the lowest region and the material flows into this lowest region during the melting step.

Figure 34:
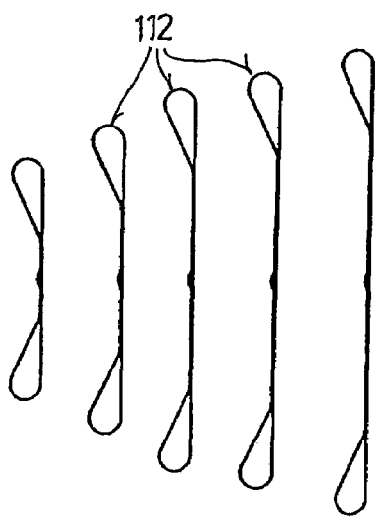

FIG. 34 shows can jacket strips having differing circumferences, which can all be produced with the same installation and only minor changes.

FIGS. 36 to 39 describe the solution for cutting off individual can jackets 240, which solution is new and inventive regardless of the type of connection between the can jacket 240 and the at least one closure member 242.

FIG. 36 schematically shows how in an expansion region 271 a flat-pressed can jacket strip 270 is reshaped into a can-jacket strip 272 with circular cross section with the aid of an expansion element 273 on the inside of the can jacket strip. Individual can jackets 240 are then cut off this circular can-jacket strip 272.

The expansion element 273 is held by holding rods 274 which are guided in the two curving regions 112c of the flat-pressed can jacket strip 270 and extend from the expansion element 273 to a holder 275, as shown in FIG. 37, meaning in a region in which the strip-shaped flat material 116 is not yet closed. A scaling bulge 266 is furthermore arranged on the flat material 116. The flat material is reshaped by way of non-depicted rolls into the flat-pressed, closed form and welded with a laser beam provided by a laser feed 130'. Subsequently, the sealing bulge 266 is applied to the inside of the longitudinal seam 124, if necessary by way of a melting step. The can jacket strip is then moved to the expanding region 271 where it is reshaped to have a circular cross section.

FIG. 39 shows a device for cutting off individual can jackets 240. Conveying elements 276 fit without friction against the can jacket strip, preferably the circular can jacket strip 272, and pull the can jacket strip through the expansion region 271. The cutting device 277 comprises a support edge 278, which is closed to form substantially a circle that extends in a normal plane to the longitudinal axis of the can jacket strip, fits directly against the inside of the can jacket strip, and cooperates with at least one cutting tool 279, preferably a cutting ring. The cutting ring 279 is rotated eccentrically to the support edge 278 during the cutting operation, so that a cutting region rotates once around the longitudinal axis, thereby cutting off a section of the can jacket strip. During the cutting operation, the support edge 278 and the cutting ring 279 are advanced along with the can jacket strip. Following the cutting operation, the cutting ring 279 is moved to a concentric position relative to the support edge 278 and is moved along with the support edge 278 counter to the movement of the can jacket strip, back to the starting position occupied prior to the cutting operation.

The support edge 278 is positioned on the expansion element 273. To realize a controlled forward and backward movement, a piston-cylinder unit 280 is arranged, for example, between the expansion element 273 and the support edge 278 and possibly also a return spring 281. The piston-cylinder unit 280 is operated by way of a compressed fluid, for which a drive device 280b (FIG. 37) is connected via a feed line 280a to the piston-cylinder unit 280. It is understood that a different adjustment device can be used which is known from prior art, in particular one provided with an electric drive.

The cutting ring 279 is positioned on a rotating part 282, such that it can move in axial direction. The rotating part 282, in turn, is arranged rotating in bearings 284 on a support pipe 284, which projects in axial direction from a holding plate 285. A rotational feed-in 286 for a compressed fluid, for example, is provided between the holding plate 285 and the rotational part 282. The compressed fluid is supplied by way of a drive device 287 and via a feed line 288, the rotational feed 286, and a ring-shaped channel 282a to the piston-cylinder unit 289, which is attached to the rotating part 282 and moves the cutting ring 279 in the direction of the longitudinal axis. For the controlled forward and backward movement of the cutting ring 279, the piston-cylinder unit 289 is assigned respectively one return spring 290. It is understood that a different adjustment device known from prior art can also be used, in particular an electrically driven one.

For the cutting operation, the cutting ring 279 must be rotating and positioned eccentrically relative to the rotating part 282. A rotating drive 291 maintains the rotation of the rotating part 282 via a drive transmission 292, preferably a belt running on wheels. The change of the cutting ring 279 from the centered to the eccentric position is achieved, for example, with two adjustment devices 293, 294. The first adjustment device 293 pushes the cutting ring 279 into the eccentric position and/or the cutting position and the second adjustment device 294 pushes the cutting ring 279 into the centered position where the cutting ring 279 is not in contact with the can jacket strip. So that the cutting ring 279 can be moved into these two positions, the cutting ring 279 is attached via straight guides 295, which permit a movement transverse to the longitudinal axis, to the piston-cylinder units 289.

During the forward movement and/or the cutting ring 279 movement away from the rotating part 282, the cutting ring 279 must be in the eccentric position. During the return movement and with no movement in longitudinal direction, the cutting ring 279 must essentially be positioned centrally. During the advancing movement, the drive device 287 supplies compressed fluid with increasing pressure to the piston-cylinder units 289. A first control valve 296 is connected to the ring-shaped channel 282a and is designed such that with increasing pressure a first adjustment cylinder 297 moves the cutting ring 279 with a first operating surface 298 into the cutting position. During the return movement and with no movement in longitudinal direction, the pressure in the ring-shaped channel 282a decreases and/or remains constant, and the first control valve 296 reduces the operating pressure inside the first adjustment cylinder 297 until a second adjustment cylinder 298a, owing to a pre-tensioning (pressure accumulator, spring), pushes the cutting ring 279 with a second operating surface 298a into the central position.

It is understood that in order to operate the first adjustment cylinder 298, a separate driving device with fluid feed can also be provided. In place of the cutting ring 279, it is also possible to provide a cutting tool or several cutting tools, wherein the cutting tool must be moved to the cutting position and the non-contacting position, in the same way as the cutting ring 279. If several cutting tools are distributed along the circumference, a can jacket 240 section can be cut off with less than one rotation of the rotating part 282.

The length of material advanced during the cutting operation depends on the advancing speed during the can jacket production and the speed of the rotating part 282. During the cutting with a cutting ring 279 and given an advancing speed of 1 m/s as well as 3000 rotations per minute, the advancing length is 20 mm. When doubling the speed or when using two simultaneously operating cutting tools, the advancing length can be cut in half.

The described cutting device can generally be used for cutting thin-walled jacket and/or tube sections, in particular into individual can jackets. An expansion to a circular shape can be dispensed with if the longitudinal welding seam is formed on a flat material that is reshaped transverse to the longitudinal axis to have a circular cross section. The inventive and new device for producing jacket pieces comprises a reshaping device, which continuously reshapes strip-shaped flat material 116 in transverse direction to the strip axis into a closed form, a welding device 231 for welding the longitudinal seam, and a cutting device as shown in FIG. 39 which cuts off individual can jacket sections 112. On the inside of the continuously formed can jacket strip, a support edge 278 is arranged that is held by the reshaping device and is essentially closed in circular direction, extends in a normal plane to the longitudinal axis of the can jacket strip, fits directly against the inside of the can jacket strip, and cooperates with at least one cutting tool 279.

For the cutting operation, the cutting tool 279 can be pivoted in the cutting position relative to the support edge 278, such that a cutting region rotates once around the longitudinal axis, thereby cutting off a section from the can jacket strip. During the cutting operation, the support edge 278 and the at least one cutting tool 279 can be advanced along with the can jacket strip and, following the cutting operation, the at least one cutting tool 279 can be moved to a contact-free position and, together with the support edge 278, can be moved back to the starting position it occupied prior to the cutting operation, meaning counter to the movement of the can jacket strip. It is understood that any type of cutting tool can be used in place of the cutting ring.

It is understood that the above-described features can be combined into different types of embodiments and that the above-described new and inventive solutions can also be claimed independent of the present patent claims.

The invention claimed is:

1. A method for producing a can body, for which a can jacket that is closed in a first joining step by a first joint is produced from a flat material and at least one closure member is arranged on the closed can jacket with at least one additional joint, wherein at least one additional joint is embodied as a laser-welded seam which forms a ring-shaped, circumferential closing seam between the closed can jacket and the at least one closure member, wherein seam contact surfaces of the can jacket and the closure member that are pressed against each other prior to the welding of the closing seam are embodied as ring-shaped circumferential edge regions which are at least one of expanded and necked down in a direction along a longitudinal axis of the can for the welding of the closing seam, the method comprising:
pushing the can jacket and the at least one closure member together, with the edge regions getting to a stop position, wherein from the end faces of the two edge regions one is positioned on the inside and one on the outside of the can body;
forming the closing seam when two air-free adjoining seam contact surfaces are at a stop position against each other; and
an expanding step wherein the can jacket is inserted into an external mold, a hose element is arranged inside of the can jacket and the hose element is expanded, thereby the hose element is pressing the can wall against the external mold, wherein the hose element is separated from the can jacket.

2. The method according to claim 1, wherein the first joint is embodied as a longitudinal seam in the form of a laser-welded butt seam for which the two end faces on the side of the flat material form the seam contact surfaces and the wall thickness of the can jacket is essentially constant along the complete circumference.

3. The method according to claim 1, wherein prior to the welding of a closing seam, edge regions which are necked down toward the end faces are formed on both end faces of the can jacket.

4. The method according to claim 1, wherein the expanding step is performed prior to the welding of the closing seam, and wherein at least the edge regions near the end faces are formed, if necessary also an engagement region for a can lid and in particular decorating structures.

5. The method according to claim 1, wherein the expanding step is performed following the welding of at least one closing seam.

6. The method according to claim 1, wherein the flat material of the can jacket comprises a decorating film on the outside.

7. The method according to claim 1, wherein the flat material of the can jacket comprises on the inside an internal film and that at least one covering device is arranged on the inside film, the at least one covering device being applied to the longitudinal seam after the welding, in such a way that it joins tightly with the inside film on both sides of the longitudinal seam, thereby covering the longitudinal seam.

8. The method according to claim 7, wherein the covering device comprises respectively at least one sealing bulge, wherein the at least one sealing bulge is made to flow, in a melting step, such that the longitudinal seam is covered by the material of the sealing bulge.

9. The method according to claim 1, wherein the at least one closure member comprises on the inside a plastic inside coating including a sealing bulge, wherein the sealing bulge is heated to the flow temperature following the forming of the closing seam, such that the end face positioned on the can inside is covered by the material of the sealing bulge.

10. The method according to claim 1, wherein the adjoining seam contact surfaces are non-coated during the welding of at least one closing seam.

11. The method according to claim 1, wherein at least one closing seam is covered on the outside of the can body by a base covering.

* * * * *